United States Patent
Naier et al.

(10) Patent No.: US 10,894,885 B2
(45) Date of Patent: Jan. 19, 2021

(54) CROSSLINKABLE COMPOSITION AND METHOD FOR PRODUCING A COATED ARTICLE

(71) Applicant: HWK KRONBICHLER GMBH, Ebbs (AT)

(72) Inventors: Benjamin Naier, Innsbruck (AT); Herwig Schottenberger, Patsch (AT); Anna Daxenbichler, Innsbruck (AT); Thomas Bechtold, Dornbirn (AT); Gabriel Parti, Innsbruck (AT); Maximilian Andre, Achenkirch (AT); Simon Kronbichler, Ebbs (AT); Reinhard Kronbichler, Ebbs (AT)

(73) Assignee: HWK—KRONBICHLER GMBH, Ebbs (AT)

( * ) Notice: Subject to any disclaimer, the term of this patent is extended or adjusted under 35 U.S.C. 154(b) by 7 days.

(21) Appl. No.: 16/078,726

(22) PCT Filed: Feb. 24, 2017

(86) PCT No.: PCT/EP2017/000261
§ 371 (c)(1),
(2) Date: Aug. 22, 2018

(87) PCT Pub. No.: WO2017/144180
PCT Pub. Date: Aug. 31, 2017

(65) Prior Publication Data
US 2019/0048203 A1 Feb. 14, 2019

(30) Foreign Application Priority Data
Feb. 25, 2016 (EP) .................................. 16157388

(51) Int. Cl.
*C09D 4/00* (2006.01)
*C08F 26/06* (2006.01)
(Continued)

(52) U.S. Cl.
CPC ............... *C09D 4/00* (2013.01); *C08F 26/06* (2013.01); *C09D 5/00* (2013.01); *C09G 3/00* (2013.01);
(Continued)

(58) Field of Classification Search
None
See application file for complete search history.

(56) References Cited

U.S. PATENT DOCUMENTS

| | | |
|---|---|---|
| 4,366,300 A | 12/1982 | Delescluse |
| 5,131,674 A | 7/1992 | Tokui et al. |

(Continued)

FOREIGN PATENT DOCUMENTS

| | | | | |
|---|---|---|---|---|
| CA | 2771763 A1 | * | 10/2012 | .......... C09D 143/02 |
| CN | 1456563 A | * | 11/2003 | |

OTHER PUBLICATIONS

Machine translation of CN 1456563 A, retrieved Apr. 2020. (Year: 2020).*

(Continued)

*Primary Examiner* — Nicole M. Buie-Hatcher
(74) *Attorney, Agent, or Firm* — Kilyk & Bowersox, P.L.L.C.

(57) ABSTRACT

The invention relates to a crosslinkable composition comprising functionalized monomers comprising a crosslinkable group, a cationic group and a fluorinated group, wherein the composition comprises anions corresponding to the cationic groups of the functionalized monomers, wherein the cationic group is an N-substituted cyclic and in particular heteroaromatic group comprising a 5-membered ring and/or at least two heteroatoms and wherein a spacer which is an uncharged and unfluorinated organyl group and preferably an alkylene group is arranged between the cationic group and the fluorinated group.

17 Claims, 9 Drawing Sheets

Figure 1:
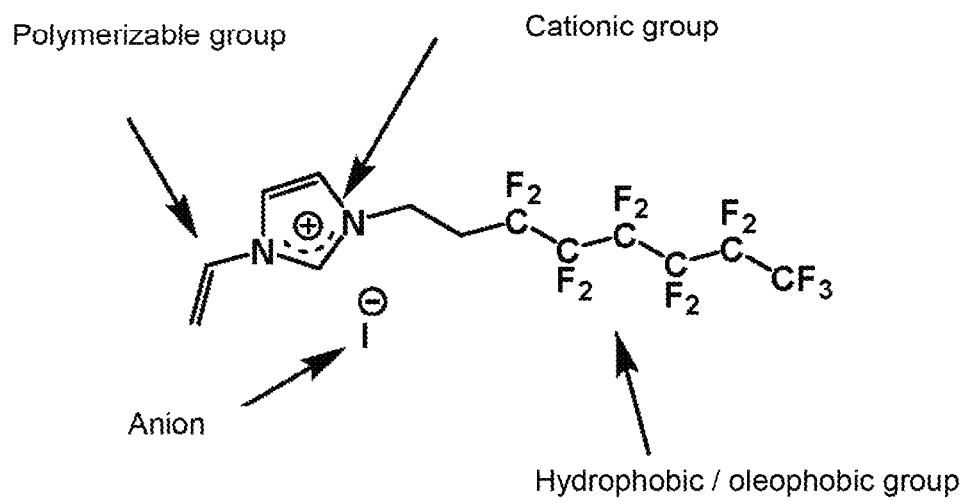

(51) Int. Cl.
- *D06M 13/272* (2006.01)
- *D06M 13/348* (2006.01)
- *C08F 226/06* (2006.01)
- *C09D 5/00* (2006.01)
- *C09G 3/00* (2006.01)
- *D06M 13/144* (2006.01)

(52) U.S. Cl.
CPC ........ *D06M 13/144* (2013.01); *D06M 13/272* (2013.01); *D06M 13/348* (2013.01); *C08F 226/06* (2013.01); *D06M 2200/11* (2013.01); *D06M 2200/12* (2013.01)

(56) References Cited

U.S. PATENT DOCUMENTS

| | | |
|---|---|---|
| 2005/0287111 A1 | 12/2005 | Schlenoff et al. |
| 2009/0286976 A1 | 11/2009 | Lee et al. |
| 2010/0273016 A1* | 10/2010 | Meiwa ................ C08F 220/56 428/479.6 |
| 2012/0101184 A1 | 4/2012 | Wang et al. |
| 2012/0149800 A1 | 6/2012 | Lewandowski et al. |
| 2014/0045977 A1* | 2/2014 | Hsiao ................ C07D 233/56 524/106 |

OTHER PUBLICATIONS

Kasper et al. "A Library of Fluorinated Electrophiles for Chemical Tagging and Materials Synthesis", J. Org. Chem., 2016, 81, 8095-8103. (Year: 2016).*

Supporting Information for Kasper et al. "A Library of Fluorinated Electrophiles for Chemical Tagging and Materials Synthesis", J. Org. Chem., 2016, 81, 8095-8103. (Year: 2016).*

Azaceta et al. "Synthesis and characterization of poly(1-vinyl-3-alkylimidazolium) iodide polymers for quasi-solid electrolytes in dye sensitized solar cells", Electrochimica Acta, 2010, 56, 42-46. (Year: 2010).*

Bobbink et al. "Functionalized Ionic (Poly)Styrenes and their Application as Catalysts in the Cycloaddition of $CO_2$ to Epoxides", Helvetica Chimica Acta, 2016, 99(11), 821-829. (Year: 2016).*

International Search Report and Written Opinion (with English translation of International Search Report) issued in corresponding International Patent Application No. PCT/EP2017/000261 dated Apr. 10, 2017 (13 pages).

* cited by examiner

Halogen complex; iodide iodine adduct

CROSSLINKABLE COMPOSITION AND METHOD FOR PRODUCING A COATED ARTICLE

This application is a National Stage Application of PCT/EP2017/000261, filed Feb. 24, 2017, which claims priority to European Patent Application No. 16157388.6 filed Feb. 25, 2016.

The invention relates to a crosslinkable or polymerizable composition comprising functionalized monomers that have a crosslinkable or polymerizable group. The invention further relates to a method of manufacturing a coated article and to a coated article manufactured using said method.

Coatings and waxes having both hydrophobic and oleophobic properties (amphiphobic properties) are of interest for a plurality of applications, inter alia as a dirt-repelling coating or impregnation (optionally covalently bonded by grafting) of fibers, fabrics, wires, and textiles, as anti-graffiti coatings, as anti-fouling coatings, as an additive in dental medicine, as a fluorosurfacant, or as a sliding aid for running surfaces of winter sports equipment such as skis. Such coatings or waxes frequently include monomers containing fluorine or their crosslinked products.

U.S. Pat. No. 4,366,300 A1 describes a polymerizable ski wax that can have a polymerizable monomer containing fluorine of the following structure:

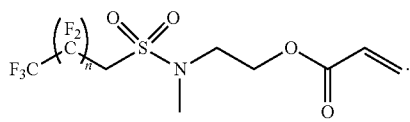

U.S. Pat. No. 5,131,674 A1 describes a ski wax comprising an alcohol having a perfluoroalkyl group, an ester having a perfluoroalkyl group and/or a perfluoroalkyl ester polymer of (meth)acrylic acid. The components containing fluorine therein have a melting point of below 100° C.

EP 0 890 579 A1 describes a method of derivatization of cellulose using monomers containing fluorine, which can, for example, serve the functionalization of textiles.

Cationic polymerizable fluorine systems are known, for example, from patent application US 2005/0287111 A1. The use of such systems for germicidal ship paints is described there. The use of the following monomer is inter alia proposed:

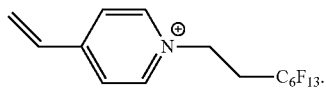

Cationic and slightly fluorinated crosslinker systems are likewise known. The synthesis of a diacrylate for use in dental medicine having the following structure is, for example, described in the laying open document US 2010/0256242 A1:

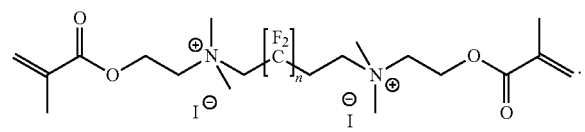

Fluorinated polymerizable compounds based on imidazole are described in US 2009/0286976 A1. The synthesis of these compounds is, however, complex and requires special reaction conditions. An example of such a compound is the following imidazolium salt:

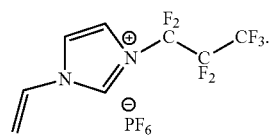

It is the aim of the invention to provide a crosslinkable fluorinated composition that can be processed in a simple manner into coatings or waxes having exceptional hydrophobic, oleophobic, and antistatic properties.

Against this background, the invention relates to a crosslinkable or polymerizable composition comprising functionalized monomers that have a crosslinkable or polymerizable group, a cationic group, and a fluorinated group, wherein the composition comprises anions corresponding to the cationic groups of the functionalized monomers. In accordance with the invention, the cationic group is an N-substituted cyclic and in particular heteroaromatic group that comprises a 5-membered ring and/or at least two heteroatoms. In accordance with the invention, a spacer that is an uncharged and unfluorinated organyl group and preferably a C1 to C6 alkylene group is arranged between the cationic group and the fluorinated group.

The term of polymerization as understood here describes a crosslinking of individual monomers to one another. The term of crosslinking as understood here represents an umbrella term for the polymerization, on the one hand, and for a crosslinking with other substrates (for example, grafting onto surfaces of a carrier substrate). The formation of a covalent bond is understood by this. A "crosslinkable" functionality in accordance with the present understanding also comprises polymerizable functionalities.

The compositions in accordance with the invention can be crosslinked or polymerized substantially better with respect, for example, to compositions having fluorinated cationic monomers already known from US 2005/0287111 A1 or US 2009/0286976 A1. Coatings having higher fluorine concentrations and improved hydrophobic and oleophobic properties can thus be provided. In addition, the synthesis is more economic and can be carried out under milder conditions.

The functionalized monomers further provide a high flexibility in synthesis and the composition overall enables a high flexibility in the properties of a coating resulting therefrom.

The fluorinated group comprises C—F bonds. A hydrophobic and oleophobic effect of a coating emanates from the fluorinated group that is stabilized by the polymerization of the composition in accordance with the invention. The cationic group enables the solution of the functionalized monomers in solvents having a higher polarity and increases the interaction with substrates that have at least one negative partial charge.

A polymer coating that has repetitive units that go back to the functionalized monomers can, for example, be produced by polymerization from the composition in accordance with the invention.

In an embodiment, the functionalized monomers are already present as prepolymerized, as oligomeric or polymeric units (optionally copolymeric or cooligomeric units) in the composition, with repetitive units of these oligomeric or polymeric units going back to the functionalized monomer. In this embodiment, the invention comprises a crosslinkable composition having such oligomeric or polymeric units. They can therefore be telechelic units, i.e. oligomers that are further crosslinkable at their ends.

In an embodiment, the cationic group is an N,N-disubstituted imidazolium group. One of the N-substituted groups can comprise or represent the crosslinkable group and the other one of the N-alkyl groups can comprise the spacer and the fluorinated group. Such monomers have particularly advantageous properties with respect to their synthetic access and in polymerization.

In an embodiment, the functionalized monomers comprise exactly one cationic group.

In an embodiment, the crosslinkable group comprises a crosslinkable ethylenic functionality, i.e. an ethylenically unsaturated group or more generally a reactive double bond. A substituted or unsubstituted vinyl group is particularly preferred in this connection. This can be advantageous to crosslink the systems with a substrate surface by means of the double bond (grafting). Such addition reactions can, for example, be of importance in the coating of textiles.

Provision can, for example, be made that a vinyl group is directly substituted at the N1 of a cationic imidazolium group of the functionalized monomer. These monomers can be crosslinked or polymerized with a particularly good yield and with high kinetics. The numbering system used for the present embodiment is the following:

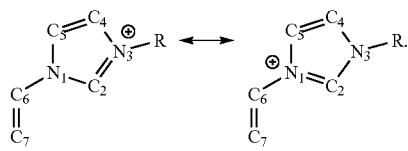

Allyl groups, (meth)acrylate groups or (meth)acrylamide groups are also possible as alternative crosslinkable ethylenic functionalities.

In an embodiment, the functionalized monomers comprise exactly one crosslinkable group.

In an embodiment, the fluorinated group is a completely fluorinated hydrocarbon group. A completely fluorinated and optionally linear group of the type $-(CF_2)_n-CF_3$ is preferred, where n is between 2 and 9 and is preferably 4, 5, or 6. A completely fluorinated hydrocarbon group is to be understood as a perfluoroorganyl group in which all hydrogen atoms have been replaced with fluorine atoms. The chain length of 5 to 7 (n=4-6) is particularly advantageous since the hydrophobic and oleophobic properties of a coating produced by polymerization of the composition are already very highly pronounced with this chain length, but good environmental compatibility is still simultaneously present. The use of a perfluorohexyl group having the structural formula $-(CF_2)_5-CF_3$ is particularly preferred.

The fluorinated group is covalently bonded to the cationic group indirectly by means of the spacer.

The spacer is preferably a preferably linear alkylene group having between 1 and 10 carbon atoms, preferably between 1 and 5, and further preferably between 2 or 3, carbon atoms. Ethylene is particularly preferred.

In an embodiment, the fluorinated chain can comprise a fluoroether. In these cases, the spacer is preferably a methylene group or an ethylene group.

Provision is made in an embodiment that the spacer and the fluorinated group are bonded to the N3 of a cationic imidazolium group of the functionalized monomer. The numbering method used is here as explained in connection with the crosslinkable N1 vinyl group.

In an embodiment, the functionalized monomers comprise exactly one fluorinated group.

In an embodiment, the substitute comprising the spacer and the fluorinated group has the formula $-(CH_2)_2-(CF_2)_5-CF_3$.

In an embodiment, the functionalized monomer has the structure shown below, with n being defined as above.

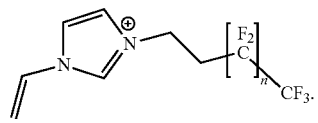

Alternatively, the following substances can also be considered:

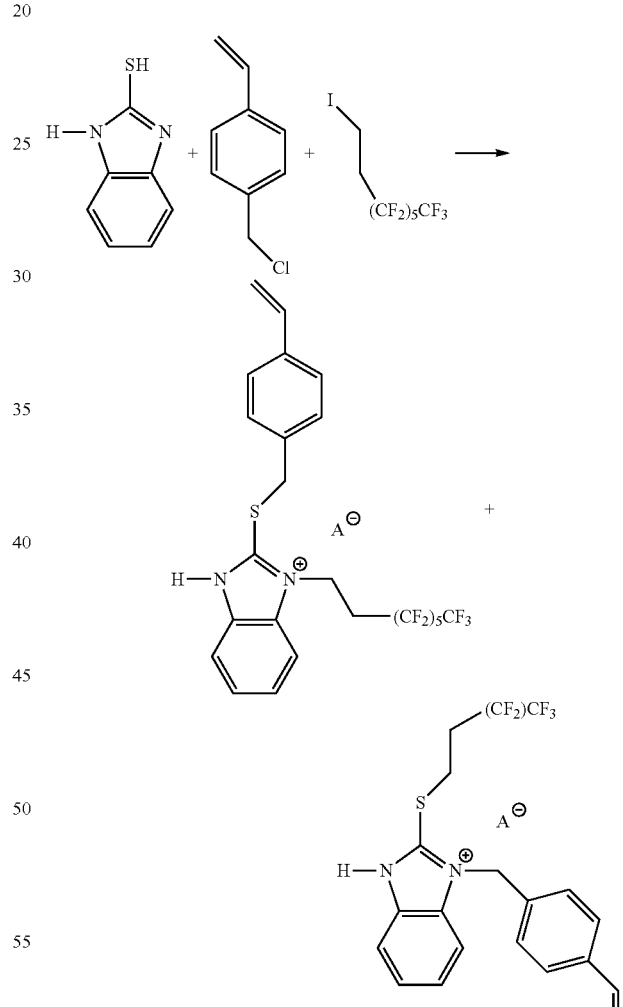

$A^{\ominus}$ = Mixture of chloride and iodide

In an embodiment, the functionalized monomer further comprises a thioether or an organyl sulfide group. A further functionalization of the monomer can thereby be performed in an efficient manner. The thioether can, for example, be directly substituted at the C2 of a cationic imidazolium group of the functionalized monomer.

The thioether can be obtained by substitution reaction from a thione group or a thiol group and, for example, from a halogenated hydrocarbon.

Alternatively to the thioether, the functionalized monomer in the crosslinkable composition can also have a thione group as a potential pre-stage of a thioether. This group can serve as a protective group during the polymerization reaction and can subsequently be further derivatized in the polymerized or partially polymerized state of the composition to obtain a thioether.

The thione can, however, also be oxidatively transferred into a disulfide after the polymerization of the composition, for example. A desired modification can take place by a subsequent alkylation at the thione.

A further advantage of the thione group is that it is able to form metal complexes. This can specifically be of great importance as an adhesive-promoting agent on metal surfaces.

In an embodiment, the functionalized monomers, where present, comprise exactly one thioether or exactly one thione group.

Alternatively to a thioether or to a thione group, other sulfurous groups such as thiol groups, sulfoxide groups, sulfonic acid groups, or sulfonic acid ester groups can also be used.

In an embodiment, the organyl residue of the thioether (of the organyl sulfide group) has the or a further crosslinkable group. The further crosslinkable group can be a crosslinkable ethylenic functionality or a reactive double bond as described above in connection with the crosslinkable group or it can be a non-ethylenic crosslinkable group. In this embodiment, the functionalized monomer carries at least two crosslinkable groups and can therefore serve as a transverse crosslinker. Suitable ethylenic crosslinkable groups in turn in particular comprise substituted or unsubstituted vinyl groups. Alternatively, allyl groups, (meth) acrylate groups, or (meth)acrylamide groups are in turn conceivable. Suitable non-ethylenic crosslinkable groups, for example, comprise isocyanate groups or epoxide groups or also hydroxyl groups or an amino group that can, for example, react with isocyanates. If a non-ethylenic crosslinkable group is selected, the monomers functionalized in this manner can connect different polymer classes to one another as crosslinkers.

In an embodiment, the functionalized monomer comprises a further fluorinated group that is substituted at the organyl residue of the thioether (of the organyl sulfide group) or that represents the organyl residue of the thioether. In the first case, the organyl residue serves as the spacer. In this embodiment, the functionalized monomer can therefore have two or even more than two fluorinated groups, with a first fluorinated group, for example, being substituted at the N3 of a cationic imidazolium group and/or a further fluorinated group being substituted directly or indirectly at the sulfur. The organyl residue of the thioether can therefore have perfluorinated portions to further increase the hydrophobic and oleophobic properties of the functionalized monomer.

In an embodiment, the functionalized monomers have between 8 and 50 heavy atoms, and preferably between 10 and 30 heavy atoms. A heavy atom is understood as all atoms except for hydrogen in the present case.

In an embodiment, the molar mass of the functionalized monomers is between 100 and 3500 g/mol, preferably between 130 and 1000 g/mol.

In an embodiment, the functionalized monomers are ionic liquids.

In an embodiment of the functionalized monomer, the cationic group is between the crosslinkable group and the fluorinated group. The constitution of the functionalized monomer is therefore such in this embodiment that the preferably single chain of covalent bonds extending between the crosslinkable group and the fluorinated group runs through the cationically charged center, for example through the positively charged nitrogen atom or the ring containing nitrogen and having the delocalized positive charge. Such monomers are obtained, for example, in that reactants comprising a crosslinkable group and an amino group or an imino group or a heterocycle containing nitrogen are quaternized, with the fluorinated group being added as part of the quaternization of the nitrogen.

In an embodiment, the crosslinkable group, the fluorinated group, and the thioether are arranged in star shape starting from the cationic group. Such molecules can be obtained, starting from the described precursors in which the cationic group is between the crosslinkable group and the fluorinated group, by addition of a sulfur at the positively charged heterocycle containing nitrogen to the thione and subsequent addition of an organyl.

In an embodiment, the organyl residue of the thioether carries the anion corresponding to the cationic group. This anion covalently bonded to the functionalized monomer can, for example, be a sulfate group, a sulfonate group, a phosphonate group, a phosphate group, a carbonate group, a carbamate group, a triflate group, or a carboxylate group, in particular a sulfonate group.

In an embodiment, the anion corresponding to the cationic group is covalently bonded, independently of the presence of a thioether, to the functionalized monomer, for example by means of an organyl residue bonded to the cationic group directly, i.e. without interposed sulfur. Examples of such suitable anions include sulfate groups, sulfonate groups, phosphonate groups, phosphate groups, carbonate groups, carbamate groups, triflate groups, or carboxylate groups, with the use of a sulfonate group being able to be preferred.

In an embodiment, the anions are not covalently bonded to the copolymer.

In an embodiment, the anion is chloride, iodide, bromide, aryl sulfonate, alkyl sulfate, sulfate, aryl phosphonate, alkyl phosphonate, monoalkyl phosphate, dialkyl phosphate, hydrogen phosphate, phosphate, hexafluorophosphate, hydrogen carbonate, carbonate, carbamate, alkyl carbonate, trifluoromethanesulfonate, bis(trifluoromethane)sulfonamide, nonaflate, or carboxylate. The use of picrate, hennate, or pyridoxal phosphate is also conceivable.

In an embodiment, the anions are anions that occur in pharmaceutically acceptable salts. They are described, for example, in Haynes et al. Wiley InterScience 2005 and in Handbook of Pharmaceutical Salts Properties, Selection, and Use 2008 Helvetica Chimica Acta.

In an embodiment, the anions can be constituents of a metal complex salt in which the imidazolium rings originally unsubstituted at the 2 position were deprotonated to NHC (NHC=nitrogen heterocyclic carbene complexes) carbene ligands (e.g. by silver oxide). For non-polymerizable imidazoles, Skalicky et al. Organometallics, 2012, 31 (4), pp 1524-1532, show a simply accessible synthesis process. In addition, the synthesis of non-crosslinkable fluoroethers is described therein.

In an embodiment, the anions are in turn crosslinkable or polymerizable compounds, whereby the anion can therefore be covalently bonded to the polymer chains in a created polymer. Such crosslinkable anions comprise a crosslinkable group and an anionic group. Suitable crosslinkable groups correspond to those groups that were discussed in connection with the functionalized monomers. Suitable anionic groups comprises the groups discussed above in connection with the free anions. Anions that are formed by splitting off an acidic proton are particularly preferred. Examples of suitable anionic monomers therefore comprise anionic derivatives of the (meth)acrylate or (meth)acrylamide, for example derivatives of the (meth)acrylate or (meth)acrylamide that include at least one sulfate group, sulfonate group, phosphonate group, phosphate group, carbonate group, carbamate group, triflate group, or carboxylate group, in particular a sulfonate group. Examples comprise acrylamido-2-methylpropanesulfonate or 3-(acryloyloxy)-1-propanesulfonate.

In an embodiment, the anions are a fluorinated surfactant that comprises an anionically charged group, preferably as discussed in the preceding paragraph, and a fluorinated group, preferably as discussed in connection with the functionalized monomer. Substitutes of the perfluorooctanoic acid (PFOA) such as 3H-perfluoro-3-((3-methoxy-propoxy) propanoic acid are particularly preferred.

In an embodiment, at least some of the anions are halogenides. Iodides are particularly preferred.

In an embodiment, the composition further comprises an halogenoalkane, with the halogenoalkane preferably carrying a fluorinated group. The fluorinated group of the halogenoalkane can, for example, also be a partially or fully fluorinated hydrocarbon group, preferably a completely fluorinated linear group of the type —$(CF_2)_n$—$CF_3$, where n is between 2 and 10 and preferably between 4 and 6. The halogenoalkane can, for example, be of the type X—$(CH_2)_m$—$(CF_2)_n$—$CF_3$, where X is a halogen and is preferably bromine or iodine and m can be between 0 and 5 and is preferably 0 since the electronegativity of the fluorine atoms promotes the formation of a halogen complex. Preferred halogenoalkanes comprise perfluorohalogenoalkanes such as 1-bromoperfluorooctane or 1-iodoperfluorohexane. The halogenoalkane can form a so-called halogen complex, which is understood as a non-covalent interaction between a halogen and an interaction partner, with the halogenide anion and preferably the iodide anion in the crosslinkable composition and also in the coating obtained by polymerization. A comprehensive description of these complexes can be found, for example, in Gilday et al., Chem. Rev. 2015, 115, 7118-7195. This already has a plurality of positive effects. On the one hand, electron density is pulled off away from the cationic group of the functionalized monomers due to the delocalization of the negative charge via the two halogen atoms of the complex, for example, which can produce a higher positive charge and therefore an improved solubility of the functionalized monomers in an organic solvent having a higher polarity. The hydrophobic and oleophobic effect of the coating obtained by polymerization can furthermore be increased by a functionalization of the halogenoalkane with a fluorinated group, without having to increase the chain length of the fluorinated group in the functionalized monomers. Finally, the halogenoalkane can also serve as an SN2 reagent for further reactions in order, for example, to react with residues of a photoinitiator.

In an embodiment, at least some of the anions are a zwitterionic compound, preferably a betaine.

In an embodiment, the composition comprises a combination of two or more different anions.

In an embodiment, the composition has additional monomers that have at least one crosslinkable group, but do not furthermore have both a cationic group and a fluorinated group. These additional monomers preferably have neither a complexing nor a fluorinated group. The additional monomers can be simple co-monomers having a crosslinkable group or transversely crosslinking monomers having two or more crosslinkable groups. In this embodiment, a polymer coating can, for example, be produced by polymerization from the composition in accordance with the invention, said polymer coating having copolymers that comprise repetitive units that go back to the functionalized monomers and to the additional monomers.

Examples of suitable additional monomers having a crosslinkable group comprise (meth)acrylic acid and (meth) acrylic acid derivatives, inter alia acrylic acid, methacrylic acid, 3-sulfopropylacrylate, hydroxyethyl(meth)acrylate and (poly)ethylene glycol(meth)acrylate. Further examples of suitable additional monomers having a crosslinkable group comprise (meth)acrylamide and (meth)acrylamide derivatives, inter alia 2-acrylamido-2-methylpropane sulfonic acid (AMPS), 2-acrylamido-2-methylpropane sulfonate, N,N-dimethyl aminoethyl acrylamide (DMAEAA), N,N-dimethyl aminopropyl acrylamide (DMAPAA), N-hydroxyethyl acrylamide (HEAA), 2-hydroxyethyl methacrylate (HEMA), dimethyl acrylamide (DMAA), N-isopropyl acrylamide (NIPAM, diethylacrylamide (DEAA),) and N-tert-butyl acrylamide (t-BAA). In addition, urethane acrylates, epoxy acrylates, and derivatives of the epoxy acrylate can be used.

Examples of suitable transversely crosslinkable monomeric units having more than one crosslinkable group include methylenemethylbis(meth)acrylate, ethylenebisethyl(meth)acrylate, (poly)ethyleneglycoldi(meth)acrylate, glycerindi(meth)acrylate, glycerintri(meth)acrylate, 1,9-nonanedioldi(meth)acrylate, dipentaerythriolhexaacrylate, dipentaerithritolpenta-/hexaacrylate, and trimethylolpropane ethoxylate triacrylate.

In an embodiment, the composition comprises uncharged fluoroacrylates as additional monomers. The functionalized monomers in this embodiment serve as surfactants for these compounds that are in turn likewise crosslinkable. Examples include 1H,1H,2H,2H-perfluorodecylacrylate, pentafluoropropylacrylate and 1H,1H,2H,2H-perfluoroalkylmethacrylates.

The crosslinkable group of at least some additional monomers and/or transversely crosslinkable monomers can be a thiol group in an embodiment. In a radical curing, the thiol group reacts with an olefin to form a thioether.

In an embodiment, the composition further comprises an initiator, preferably a photoinitiator, and further preferably a radical photoinitiator. The use of photoinitiators that respond to light in the UV range is particularly preferred. Suitable photoinitiators include, for example, 2-hydroxy-2-methyl-1-phenyl-propane-2-one, 2-hydroxy-1-[4-(2-hydroxyethoxy)phenyl]-2-methylpropane-1-one, 2,2-dimethoxy-2-phenyl acetophenone, 1-[4-(2-hydroxyethoxy)-phenyl]-2-hydroxy-2-methyl-1-propane-1-one, 1-hydroxycyclohexylphenylketone or trimethylbenzoyldiphenylphosphine oxide. The proportion of the photoinitiators in the crosslinkable composition can amount to between 0.05 and 5 wt %. Preferred ranges comprise 0.1 to 4 wt % or 0.1 to 3.5 wt %.

The composition can furthermore comprise a solvent and/or a plasticizer and/or further additives.

Suitable solvents comprise, for example, polar organic solvents. A preferred organic solvent is hydrofluoroether (HFE).

Non-fluorinated additives can, for example, be used as the plasticizer. Examples include glycerin, polyethyene glycol, tricresyl phosphate or paraffin oil. The use of paraffin oil can be preferred.

In an embodiment, the composition further comprises an ionic additive. This additive can be a system that forms an ionic liquid at 21° C. It can preferably simultaneously serve as a solvent. This system preferably comprises a cationic compound having a cationic group and a fluorinated group but without a crosslinkable group, and an anion. The hydrophobic and oleophobic properties of a coating prepared from the composition can be further increased by the use of such solvents. They can be incorporated into the network of the resulting coating and can form a film at the surface. Due to the generally low vapor pressure of ionic liquids, its concentration in the coating remains constant over a long period. The cationic and fluorinated groups of the cationic compound can be defined like the cationic and fluorinated groups of the functionalized monomer. A spacer can be present between the cationic group and the fluorinated group in the same form as has been presented in connection with the functionalized monomer. The same applies to the anion. Examples of suitable ionic additives include the following:

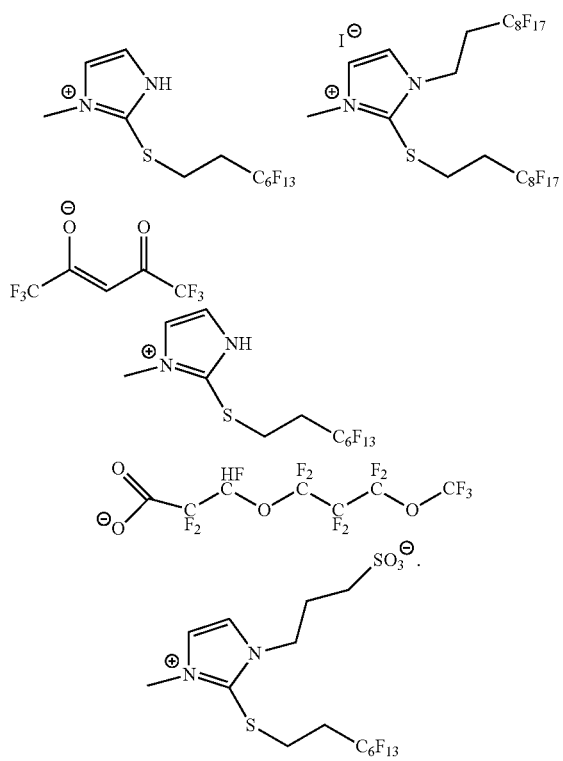

Further conceivable additives include fluorinated compounds such as perfluoropolyether.

In an embodiment, nanoparticles or nanometerials are further included as additives. They can serve to improve the scratch resistance and/or the hydrophobic and oleophobic properties of a coating resulting from the composition. Conductive particles can likewise be used, for example, to reduce the electrostatic charge or to transport frictional heat away. Examples of suitable nanoparticles include $SiO_2$ nanoparticles, carbon nanotubes, $TiO_2$ nanoparticles, graphite, fluorinated graphite, Teflon particles, and hexagonal or cubic BN nanoparticles. The use of microparticles, particularly those consisting of or comprising $SiO_2$ or Teflon, is also conceivable.

In an embodiment, the composition comprises said elements and any possible contaminants whose proportion, however, amounts to less than 3 wt % of the total mass.

Different concentrations of the functionalized monomers are to be used depending on the purpose of use and on the pharmaceutical form, In the simplest case, the composition only comprises the functionalized monomers and optionally further monomers. In this case, the proportion of the monomers (including the anions) can amount to between 93 and 99.95 wt %.

In an embodiment, the composition is a lacquer mixture which can have the following elements: 0.05-15 wt % functionalized monomer (together with anion); 0-80 wt % comonomers (together with anion if charged); 0-60 wt % transverse crosslinkers (together with anion if charged); 0-60 wt % binding agents; 0-40 wt % plasticizer; 0.05-7 wt % initiator; 0-40 wt % pigments; 0-40 wt % additives (e.g. thickening agents, dispersing additives, progression additives, anti-foaming agents, matting agents); 0-80 wt % solvent; 0-20 wt % fillers for achieving technical properties (e.g. flame retardant additives, conductive pigments); with the proviso that these elements are present such that their total proportion makes up 100 wt %. This mixture is suitable for lacquers, for example.

In another embodiment, the composition is a mixture which can have the following elements: 1-95 wt % functionalized monomer (together with anion); 0-60 wt % comonomers (together with anion if charged); 0-60 wt % transverse crosslinkers (together with anion if charged); 0-60 wt % binding agents; 0.05-7 wt % initiator; 0-40 wt % pigments; 0-40 wt % additives (e.g. thickening agents, dispersing additives, progression additives, anti-foaming agents, matting agents, pH buffers); 0-80 wt % solvent; 0-20 wt % fillers for achieving technical properties (e.g. flame retardant additives, conductive pigments); with the proviso that these elements are present such that their total proportion makes up 100 wt %. This mixture is suitable, for example, for lacquers, dental fillings, or for coating membranes that have to be extremely hydrophobic and oleophobic.

In yet another embodiment, the composition is a mixture, preferably a gel or a paste, that can comprise the following elements: 1-95 wt % functionalized monomer (together with anion); 0-90 wt % comonomers (together with anion if charged); 0-60 wt % transverse crosslinkers (together with anion if charged); 0-70 wt % binding agents; 0-60 wt % plasticizers; 0-7 wt % initiator; 0-40 wt % fillers; 0-70 wt % solvent; with the proviso that these elements are present such that their total proportion makes up 100 wt %.

In an embodiment, waxes can be manufactured with the above-described compositions that can, for example, be applied to running surfaces of winter sports equipment. These waxes can comprise the following elements, for example: 2-100 wt % of the above-described composition, 0-98 wt % paraffin wax; 0-20 wt % fillers, 0-95 wt % solvent; again, with the proviso that these elements are present such that their total proportion makes up 100 wt %.

In an embodiment, textile fibers can be coated with the composition. A composition suitable for such an application can be composed as follows, for example: 0.5-90 wt % functionalized monomer or oligomer/polymer (together with anion); 0-60 wt % comonomers or oligomers/polymers (together with anion if charged; 0-20 wt % transverse crosslinkers (together with anion if charged); 0-7 wt % initiator; 0-5 wt % catalysts; 0-40 wt % additives; 0-99 wt % solvent; with the proviso that these elements are present such that their total proportion makes up 100 wt %. This composition can be mixed in a ratio of, for example, 99:1 to 20:80 with the fibers to be coated (e.g.: cellulose, hemicellulose, lignocellulose, keratin). Provision can be made here that the fibers to be coated are saturated with the recipe and are subsequently cross-linked after possible pretreatments.

The composition can also be used, for example, for coating surfaces.

Against the initially named background, the invention further relates to a method of manufacturing a coated article, wherein the surface of the article is wetted with a crosslinkable composition in accordance with the invention and wherein the composition is subsequently crosslinked to form a coating or a composite material.

Provision can be made here that the monomers of the composition crosslink with one another to form polymers (polymerization) and/or that the monomers of the composition or the oligomers or polymers created by polymerization crosslink with the surface of the article. With the latter grafting reaction, a covalent C—C or a C—S bond can, for example, be formed between the monomer/oligomer/polymer and the surface of the article. In an embodiment, the composition can generate self-organizing monolayers at surfaces.

In an embodiment, the polymerization takes place in a photoinitiated manner, preferably while involving a photoinitiator in the crosslinkable composition.

The light used is preferably UV light.

In an alternative embodiment, curings in the visible range are also conceivable. Photoinitiators suitable for such a curing comprise, for example, bis-(4-methoxybenzoyl)diethylgermane.

In an embodiment, a radiation initiation or a photoinitiation can also take place directly, i.e. without a photoinitiator, for example by using high energy radiation such as y radiation or E-beam.

Alternatively, the polymerization can also be initiated chemically or thermally. For example, an initiation can take place using an organic peroxide such as benzoylperoxide, an inorganic peroxo system such as potassium peroxide sulfate, or an azo-based initiator such as azobisisobutyronitrile. A Fenton polymerization is also suitable for use as part of a method in accordance with the invention.

A plasma-induced anionic or cationic polymerization is furthermore conceivable.

Controlled free radical polymerizations such as RAFT (reversible addition fragmentation chain transfer polymerization), ATRP (atom transfer radical polymerization), and NMP (nitroxide mediated polymerization) are furthermore conceivable with the method-specific initiators.

In an embodiment, the cationic group of the functionalized monomer can be protected by a protective group during the manufacture of the copolymer. The protection can, for example, take place in the form of a thioketone function.

If the functionalized monomer has a thione, provision can be made that the thione is transferred into a disulfide after the polymerization of the composition and is furthermore subsequently alkylated to bring about a desired modification.

The article can, for example, be textile fibers or a completed textile to give the fibers or the textile hydrophobic and oleophobic and/or fire-retardant properties.

Generally all the groups of fibers can be coated, for example natural fibers such as cotton, hemp, linen, wool, silk, chemical fibers of synthetic polymers such as polyester, polyamide, polypropylene, chemical fibers of natural polymers such as regenerated cellulose fibers, alginate fibers, casein fibers, and inorganic fibers such as glass fibers, basalt, carbon fibers, and metal fibers or wires.

The treatment of the fibers can take place in the most varied processing stages. A treatment as part of the fiber manufacture or fiber post-treatment is possible, for example. Equally, a fiber treatment can take place in later processes as part of the chemical textile processing. A complete coating can be achieved by the application on a fiber plane since an optimum accessibility of the fiber surface is ensured. A treatment of intermediate stages and end products in the manufacture of threads, e.g. a treatment of yarns and the like is equally possible.

The application of the composition in accordance with the invention can here take place from aqueous or organic phases in the form of solvents or emulsions/dispersions. An application by spray techniques is also possible. The polymerization can, for example, take place by temperature increase during the drying process or by UV treatment.

The article can furthermore, for example, be a ski or analog running surfaces and sliding surfaces for a snow base or ice base whose running surface or upper side was coated as part of a method in accordance with the invention. The coating can here serve as a bonding agent, in particular for fluoro waxes. The friction resistance of the coated material is, however, also greatly reduced with respect to the uncoated substrate without the use of a fluoro wax. Amphiphobic coatings that do not relate to the sliding surface also serve e.g. for the rejection of adhering snow.

The article can also be nanoparticles. The coated nanoparticles can then in turn be attached or bonded to a surface or can be mixed into a composition, for example into a wax-like composition, to obtain amphiphobic surfaces or compositions. An exemplary application comprises ski wax.

Polymers are generally conceivable as ski wax, with at least some of the repetitive units going back to the functionalized monomers of the crosslinkable composition in accordance with the invention.

Surfaces of various objects can generally be coated. The coating serves as a hydrophobic and oleophobic lacquer and is extremely dirt-repellent. Superhydrophobic anti-graffiti coatings or anti-fouling coatings are conceivable. The coating is furthermore not flammable so that fire-resistant coatings can be implemented.

The invention furthermore relates, against the initially named background, to a coated article that was manufactured by a method in accordance with the invention.

The coating can be applied to one-dimensional, two-dimensional, or three-dimensional objects or can itself form a one-dimensional, two-dimensional, or three-dimensional object.

A contact angle for water of above 90° can be achieved and of above 70° for diiodomethane using the coating manufactured in accordance with the invention. Even contact angles of above 150° are possible depending on the surface and on the system selected.

An alternative application possibility of the compositions in accordance with the invention comprises the functionalized monomers being added as fluorosurfactants into a polymerizable composition in order, for example, to prevent foaming and their being installed into the polymer chains on the cross-linking of the other elements.

Fluorosurfactants are widely used in a number of industrial branches. Examples include paints, stains of wood, adhesives, oil and natural gas and drill fields, polymers, cleaning agents, fire extinguishing foam, in printing inks, chalks, waxes, hard surfaces, polishes, electronics, and metal coatings. Some important tasks here include improving the progression, reducing the "orange peel effect", reducing pinholing, improving the gloss, improving pot life, the effect as a emulsifying agent, improving the oil-repellent and water-repelling properties, monitoring the foam formation, improving the surface wetting, improving the UV stability, improving the weather resistance, coupling means, controlling the swelling behavior of hydrogels and acting as a lubricant.

Figure 2:
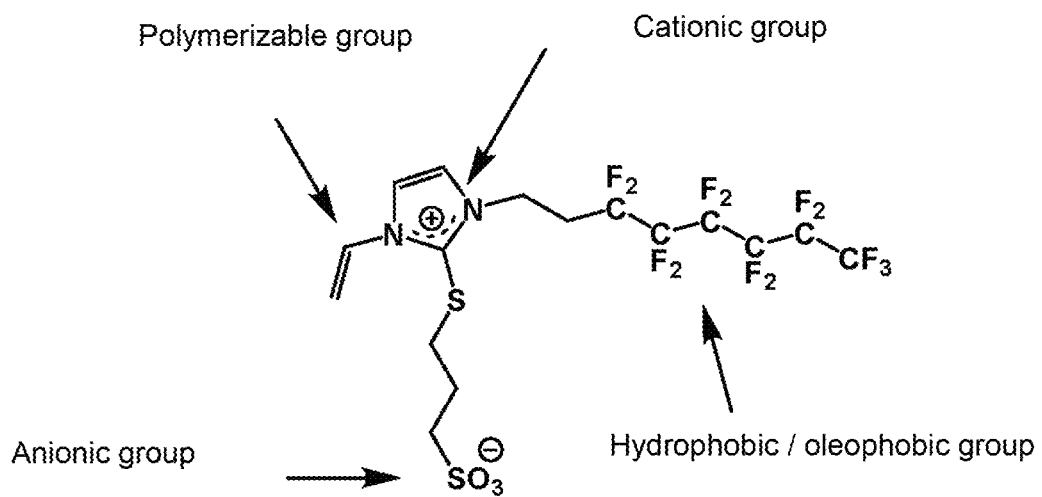
Figure 3A:
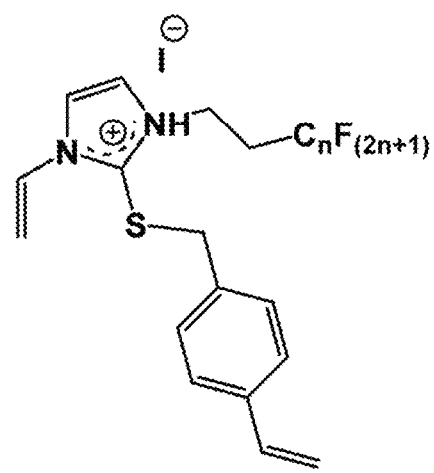
Figure 3B:
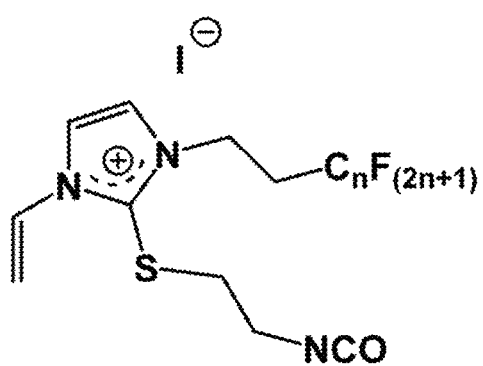
Figure 3C:
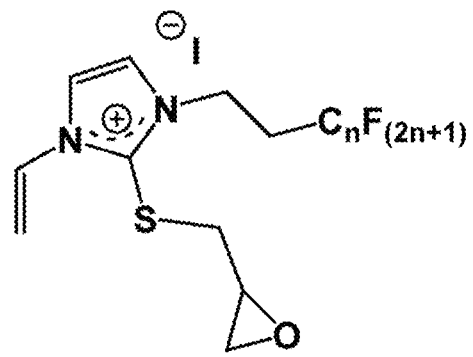
Figure 4:
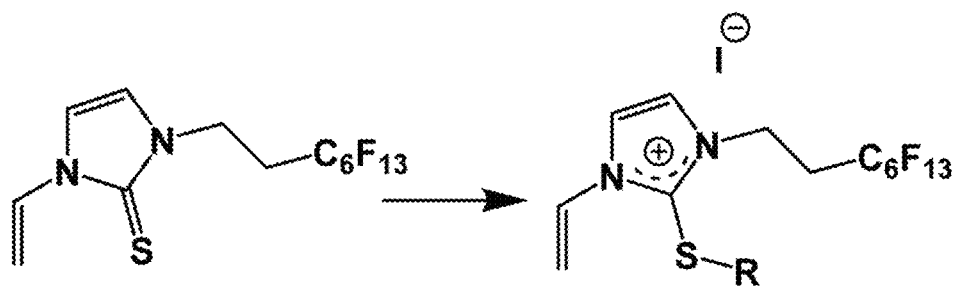
Figure 5:
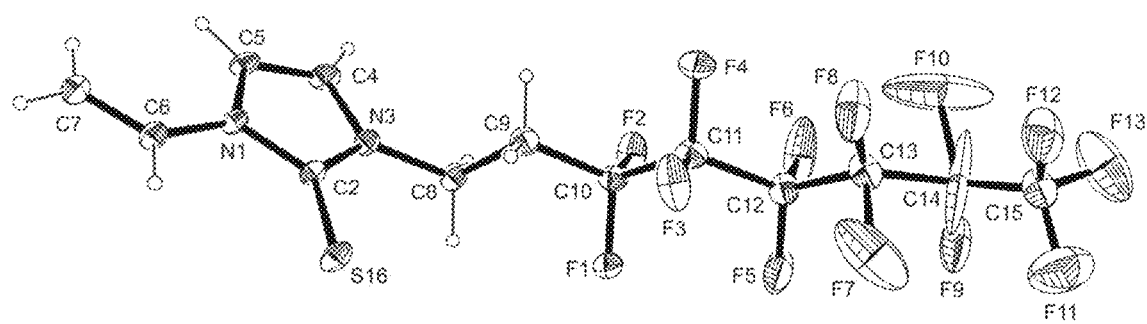
Figure 6:
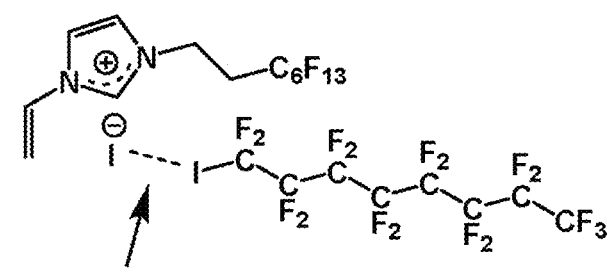
Figure 7:
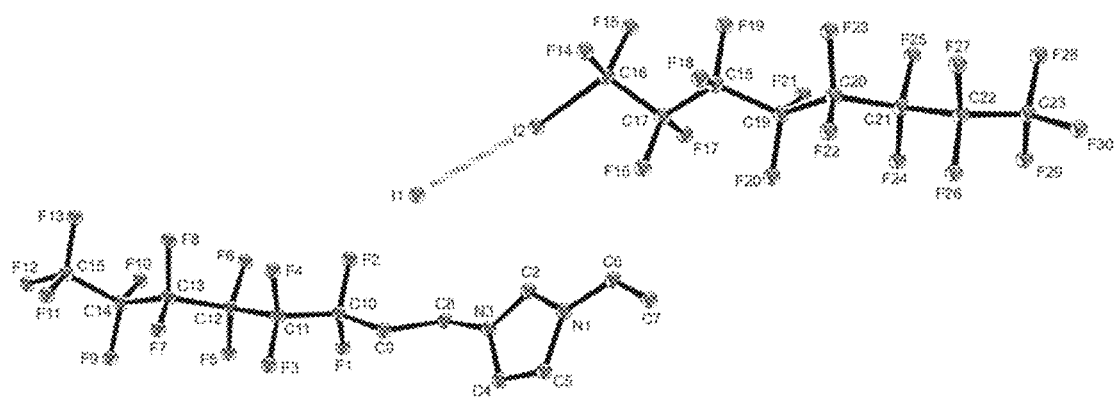
Figure 8:
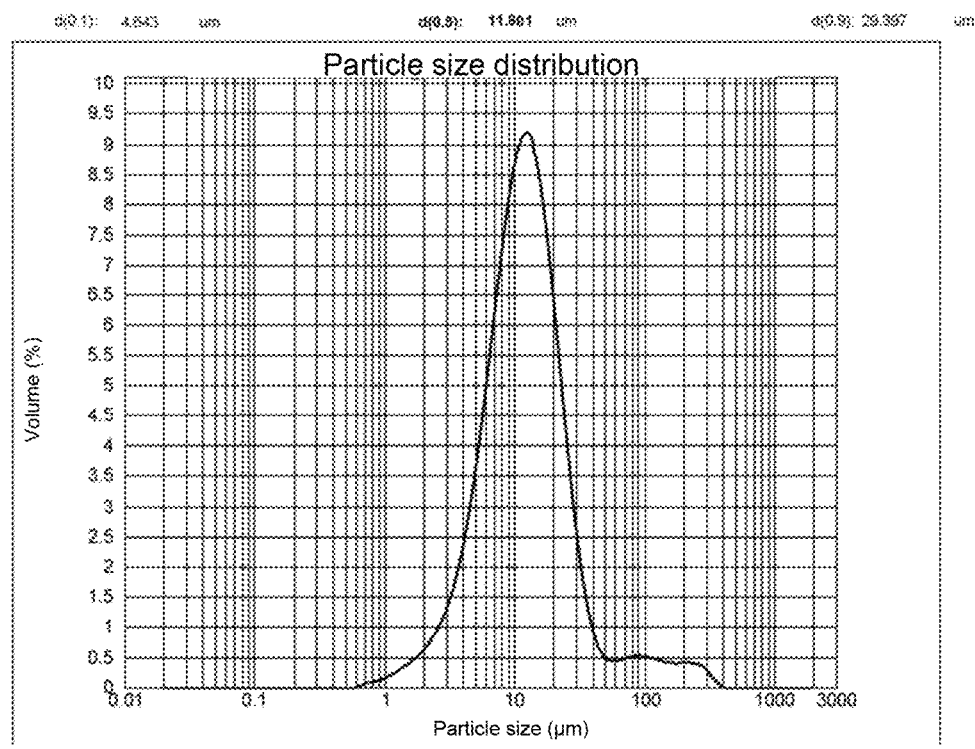
Figure 9:
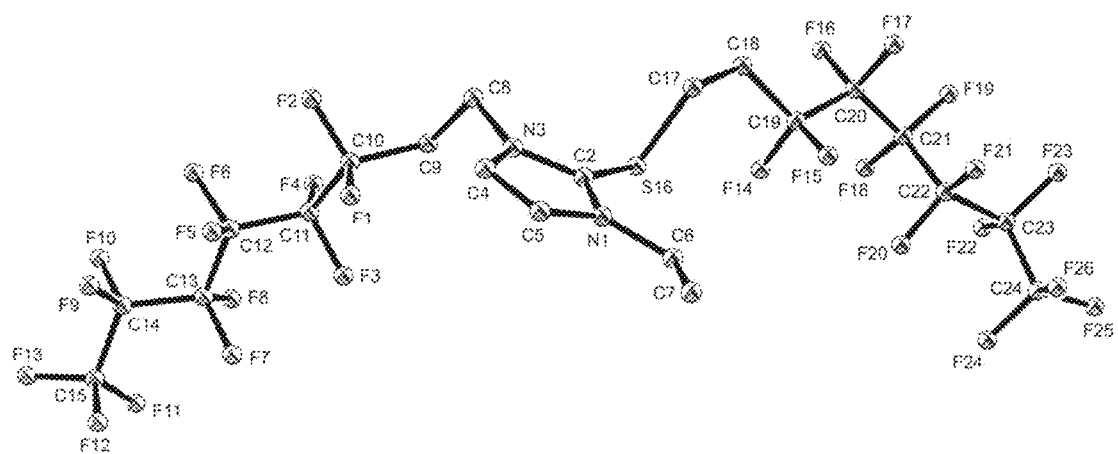
Figure 10:
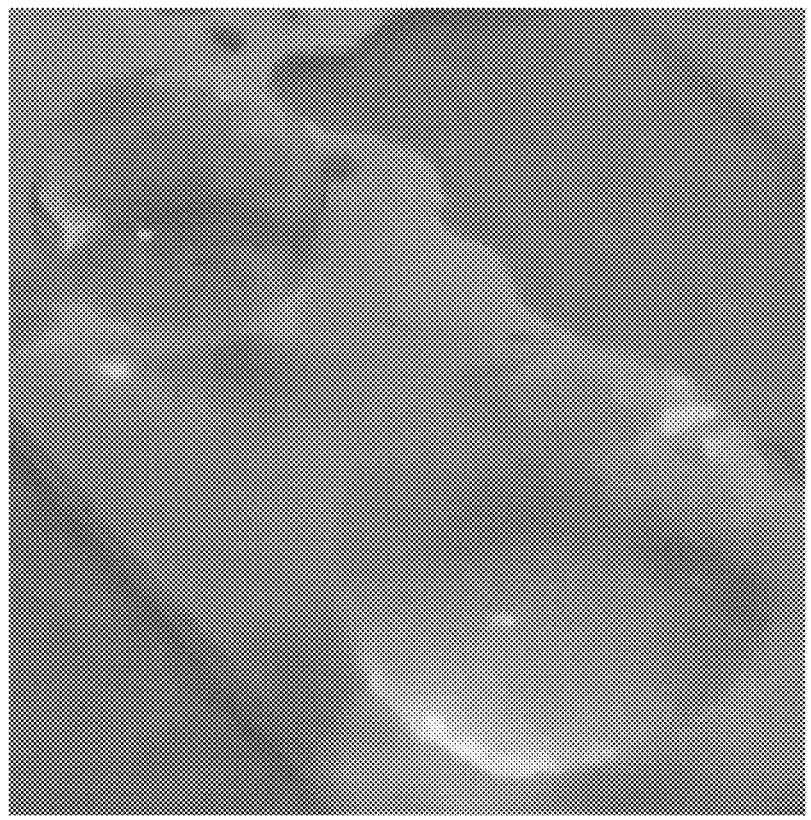
Figure 11:
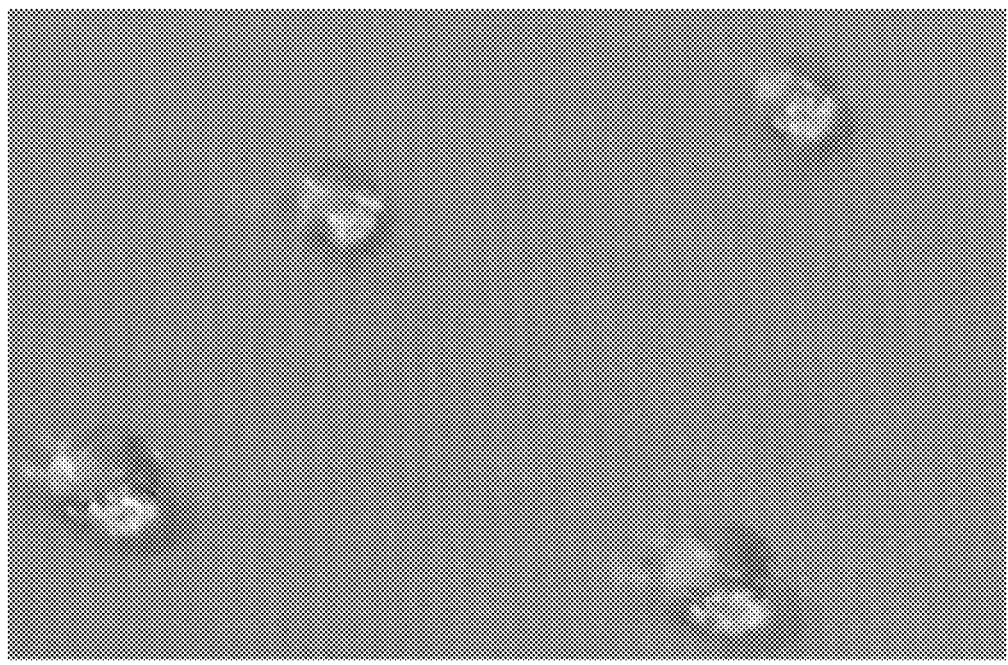

Further details and advantages of the invention result from the embodiments described in the Figures and in the following. There are shown in the Figures:

FIG. 1: an example of a preferred functionalized monomer without additional thioether functionalization;

FIG. 2: an example of a preferred functionalized monomer with additional thioether functionalization and with an anionic group at the thioether;

FIGS. 3A-3C: examples of preferred functionalized monomers with additional thioether functionalization and with crosslinkable functionalities at the thioether;

FIG. 4: a representation of a reaction for forming functionalized monomers with additional thioether functionalization from a precursor with thione functionalization;

FIG. 5: crystal structures of the thione monomer used in the reaction in accordance with FIG. 4;

FIG. 6: an example of a functionalized monomer with a sigma complex anion;

FIG. 7: crystal structures of the complex in accordance with FIG. 6;

FIG. 8: the measurement result for the particle size distribution of coated nanoparticles in accordance with Example 2;

FIG. 9: molecular structure of a difluorinated functionalized monomer;

FIG. 10: an image of a coating in accordance with the invention that is manufactured in accordance with Example 17 and that is oil-repellant and water-repellent;

FIG. 11: an image of a coated cotton in accordance with Example 10; and

Figure 12A:
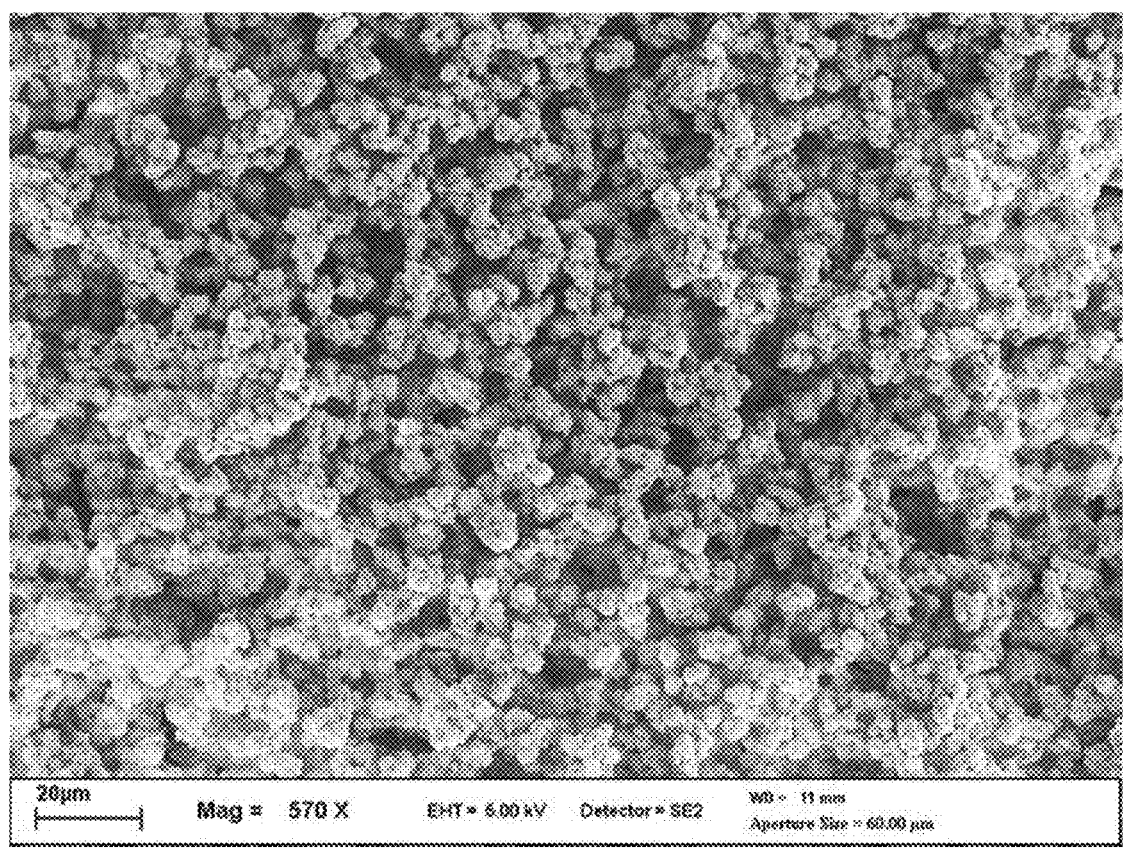
Figure 12B:
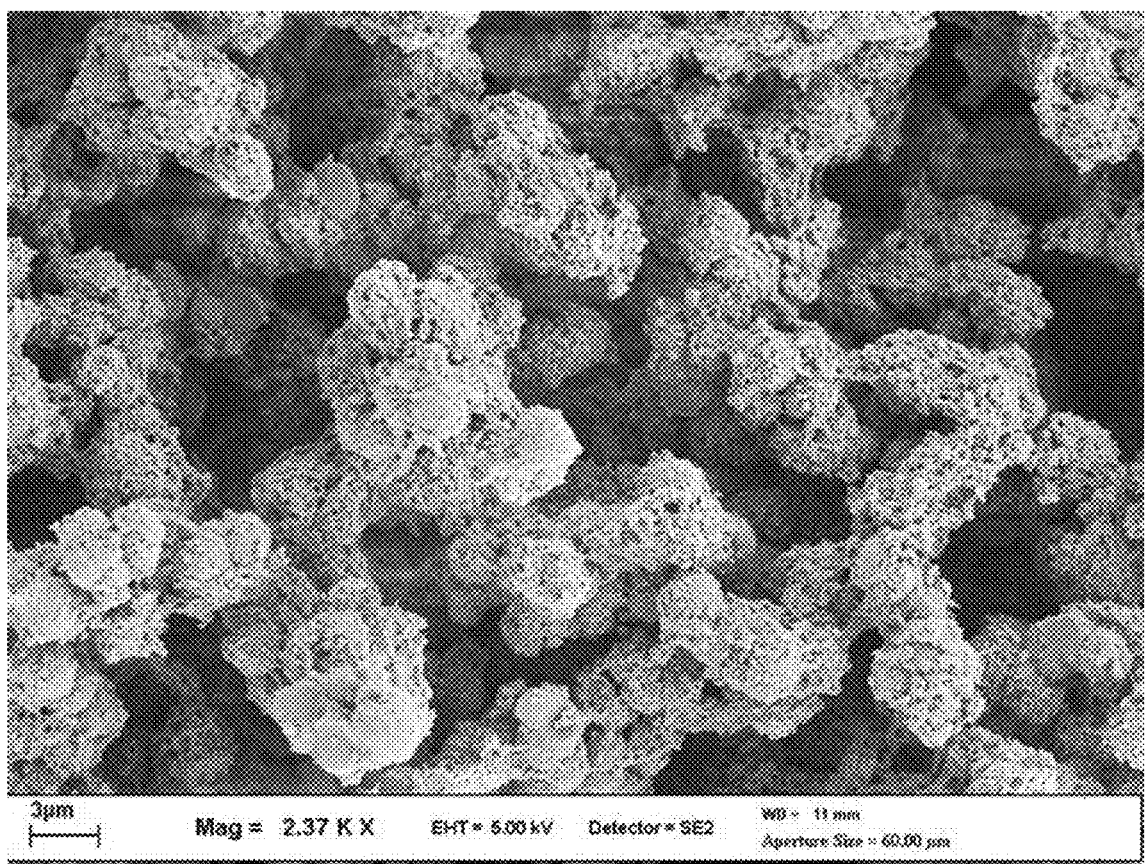

FIGS. 12A-12B: microscopic images of a coating obtained in accordance with Example 23.

A functionalized monomer that is particularly preferred within the framework of the present invention is shown in FIG. 1 with idoide as the counterion. This monomer is soluble in polar organic solvents, can be easily polymerized, and forms, after a film polymerization, a polymer coating that has excellent hydrophobic and oleophobic properties and that adheres well to the substrate, in particular when the surface of the substrate is negatively charged or polarized.

A further particularly preferred functionalized monomer is shown in FIG. 2. The anionic group bonded to the monomer can be advantageous over free anions in some embodiments. For it has a good solubility in polar solvents and additionally has a very pronounced surfactant effect through its two charged groups and through the fluoroalkyl group. It can also be crosslinked in the polymer, which results in increased biocompatibility since no surfactants can be released from the polymer. General preferred properties of zwitterionic coatings are described by Schlenoff in Langmuir 2014, 30, 9625-9636.

Examples of preferred anions having an additional thioether functionalization and crosslinkable functionalities at the thioether group are shown in FIGS. 3A-3C. The monomers carry at least two crosslinkable groups and can therefore serve as transverse crosslinkers. Where, as shown in FIG. 3A, the thioether group comprises a further ethylenic crosslinkable group, a transverse crosslinking of polymer chains of the same kind can take place. If a non-ethylenic crosslinkable group is selected, as shown in FIGS. 3B and 3C, the monomers thus functionalized can connect different polymers to one another as crosslinkers. For example, the isocyonate group of FIG. 3B can be integrated into a polyurethane chain by a catalytic polymerization reaction with alcoholic groups. The epoxy group of FIG. 3C can, as also the ethylenically crosslinkable group, be radically crosslinked or crosslinked by addition of a nucleophile.

The thioether group can be obtained by substitution reaction from a thione group and, for example, from a halogenated hydrocarbon. FIG. 4 schematically illustrates such a reaction. This reaction is simple and typically has a satisfactory to good yield. FIG. 5 shows a crystal structure of the thione monomer used in the reaction in accordance with FIG. 4. FIG. 9 shows a molecule structure of an exemplary difluorinated functionalized monomer.

FIG. 6 shows an example of a functionalized monomer having a halogen complex anion or a sigma complex anion. The anion is formed by the delocalization of charge over an iodide anion and the iodine atom of a fluorinated iodoalkane. Electron density is pulled off from the cationic group of the functionalized monomers by the delocalization of the negative charge in the anion and the hydrophobic and oleophobic effect of the system is significantly increased by the functionalization of the iodoalkane with the perfluoroalkyl group.

The molecular structure of a single crystal radiograph structural analysis of this complex is shown in FIG. 7.

EXAMPLE 1

3-(1H,1H,2H,2H Perfluorooctyl)-1-vinyl-1H-imidazoliumiodide

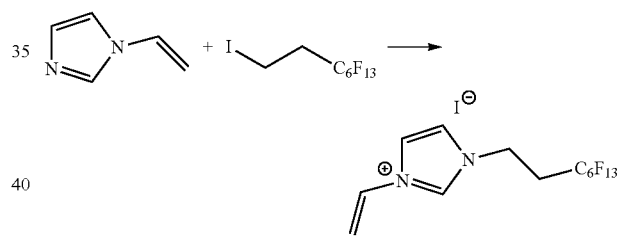

18.9 g (200 mmol) vinylimidazole and 31.7 g (66.8 mmol) 1H,1H,2H,2H-perfluorooctyliodide were boiled in a backflow process in 70 ml acetonitrile for 48 hours, 300 ml diethyl ether was then added after the cooling of the reaction solution; the mixture was then stored at −20° C. for 18 hours. The solid obtained was filtered, washed with a total of 300 ml diethyl ether, and was dried in high vacuum.

Yield: 32.84 g (86% of the theoretical yield)

$^{13}$C NMR (75 MHz, CD$_3$OD) δ 137.25 (s, C(2)), 129.76 (s, C(6)), 124.67 (s, C(5)), 121.11 (s, C(4)), 110.55 (s, C(7)), 126-100 (m, perfluorohexyl), 43.48 (t, C(8)), 31.94 (t, C(9)).

$^{1}$H NMR (300 MHz, CD$_3$OD) δ 9.53 (1H, t, C(2)H imidazole), 8.09 (1H, t, C(5)H imidazole), 7.94 (1H, t, C(4)H imidazole), 7.31 (1H, dd, C(6)H vinyl), 5.98 (1H, dd, C(7)H$_2$ vinyl), 5.53, (1H, dd, C(7)H$_2$ vinyl), 4.74 (2H, t, C(8)H$_2$—N), 3.10 (2H, ft, C(9)H$_2$—CF$_2$).

A crosslinkable composition was prepared as follows using the monomer in accordance with Example 1:

500 μm diethylacrylamide (65.79 wt %, 150 μg of the monomer in accordance with Example 1 (19.74 wt %), 100 μl trimethylolpropane triacrylate (13.16 wt %) and 10 μl 2-hydroxy-2-methylpropiophenone (1.32 wt %) were mixed into a small test tube and were held in the ultrasound bath for 10 minutes. A homogeneous yellow solution was produced.

Some of the solution was applied between two PET films having siliconized inner sides and a spacer of 75 μm.

Both films were subsequently polymerized using a 365 UV LED lamp at 24 W/cm² for 30 seconds.

Characterization took place using an IR spectrum.

The polymer film was frozen in liquid nitrogen and simultaneously pestled for the recording of the IR spectrum. An IR spectrum of the obtained powder was recorded. The characteristic C—F bands at 1237 cm⁻¹, 1213 cm⁻¹ were identified in this process. The C—O vibrations of the two acrylates were likewise recognized.

EXAMPLE 2

Cocrystal Having 1-iodoperfluorooctane

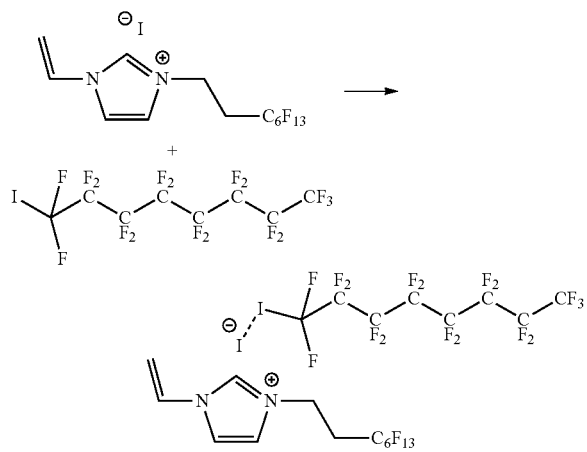

17.04 g (30.0 mmol) 3-(1H,1H,2H,2H perfluorooctyl)-1-vinyl-1H-imidazoliumiodide were dissolved in 50 ml MeOH. Subsequently, 16.38 g (30.0 mmol) iodoperfluorooctane was dropped in and the produced reaction mixture was stirred at room temperature for 5 minutes. Once the time had elapsed, the solvent was removed at the rotary evaporator. The success of the synthesis was proved, on the one hand, with reference to the solubility and, on the other hand, with reference to the crystal structure.

To determine the solubility, saturated solutions of the indicated compounds were prepared in the respective solvents and the solid was subsequently separated by means of a centrifuge. The solvent was then separated at the rotary evaporator and the solid residue was weighed. The results are collected in Table 1:

TABLE 1

|  | Solvent | Solubility (g/L) |
|---|---|---|
| 3-(1H,1H,2H,2H-perfluorooctyl)-1-vinyl-1H-imidazoliumiodide | 3M ™ Novec ™ 71 IPA | 8 |
| 3-(1H,1H,2H,2H-perfluorooctyl)-1-vinyl-1H-imidazoliumiodide cocrystal having 1-iodoperfluorooctane | 3M ™ Novec ™ 71 IPA | 500 |
| 3-(1H,1H,2H,2H-perfluorooctyl)-1-vinyl-1H-imidazoliumiodide | 3M ™ Novec ™ 7500 + 4 wt % propane-2-ole | 6 |
| 3-(1H,1H,2H,2H-perfluorooctyl)-1-vinyl-1H-imidazoliumiodide cocrystal having 1-iodoperfluorooctane | 3M ™ Novec ™ 7500 + 4 wt % propane-2-ole | 53 |

An increase of the solubility due to the halogen complex formation can be clearly recognized.

The crystal structure of the 3-(1H, 1H,2H,2H-perfluorooctyl)-1-vinyl-1H-imidazoliumiodide with iodide as the anion is shown in FIG. 7, with a halogen complex being recognizable having 1-iodopeflurooctane.

A composition comprising this cocrystal was used for coating SiO₂ nanoparticles.

For this purpose, 5.36 g of the monomer in accordance with Example 2 in 3M™ Novec™ 71 IPA (25 g/55 ml) and 0.306 g methylenebisacrylamide were dissolved in 50 dichlormethane, 2.515 g SiO₂ nanoparticles (porous, 5-15 nm) were subsequently added. The suspension was held in the ultrasound bath for 2 hours, the dichloromethane was subsequently removed at the rotary evaporator, and 2.064 g of the slightly yellowish particles were removed. 50 ml 3M™ Novec™ 7500 (hydrofluoroether) were then added and the suspension was again held in the ultrasound bath for 10 minutes; 0.1 g Darocur 1173 were subsequently added. A 15-minute irradiation of the suspension then followed with stirring. A 365 nm LED UV lamp (Phoseion FJ100) was used here at approximately 1 W/cm².

The particles obtained had a clear maximum of the particle size at 11.9 μm and an averaged particle size of 24.9 μm. They formed a stable suspension that remained stable without being deposited for 1 day in a solvent containing fluorine.

The measurement result of the particle size distribution is shown in FIG. 8.

The described nanoparticle suspension in 3M™ Novec™ 7500 was applied using a spray bottle to a ski that was coated with a polymer film likewise in accordance with the invention. A white film was produced on the ski after some minutes. It was removed using a brush until no more white residue was recognizable. The sliding properties of the ski were able to be clearly modified by this method.

EXAMPLE 3

Synthesis of 3-(1H,1H,2H,2H-perfluorooctyl)-1-vinyl-1H-imidazolium 3H-perfluoro-3-((3-methoxy-propoxy)propanoate

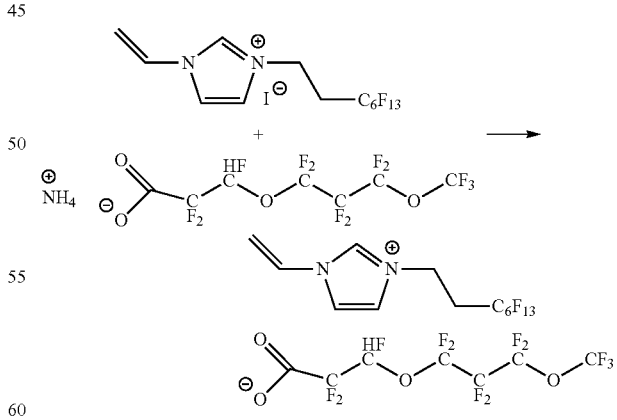

2.27 g (4 mmol) 3-(1H,1H,2H,2H-perfluorooctyl)-1-vinyl-1H-imidazoliumiodide were presented and mixed with 4 ml water and 25 ml dichloromethane; 5.3 g H-perfluoro-3-((3-methoxy-propoxy)propanoic acid) ammonium salt 30% was then dripped into water (4 mmol) and the resulting reaction mixture was stirred overnight at 25° C. Subsequently, 20 ml 3M™ Novec™ 7200 were added and the mixture was briefly shaken to bring the produced precipitation into solution. The organic/fluoroorganic phase was separated from the watery phase and was dried over $Na_2SO_4$, the solvent mixture was finally removed in the rotary evaporator, and the product obtained (a colorless oil that becomes solid over time) was dried in high vacuum overnight. 29.2 g (89% of the theoretical yield) were able to be obtained in this manner.

$^{13}$C NMR (75 MHz, CD$_3$CN) δ 164.68 (t, carboxyl-C DONA), 138.26 (s, C(2)), 130.23 (s, C(6)), 125.07 (s, C(5)), 121.23 (s, C(4)), 110.29 (s, C(7)), 126-100 (m, perfluorohexyl), 43.60 (s, C(8)), 32.34 (s, C(9)).

$^1$H NMR (300 MHz, CD$_3$CN) δ 10.10 (1H, s, C(2)H imidazole), 8.05 (1H, s (br), C(5)H imidazole), 7.93 (1H, s (br), C(4)H imidazole), 7.35 (1H, dd, C(6)H vinyl), 6.55 (1H, ddd, CHF DONA), 5.98 (1H, dd, C(7)H$_2$ vinyl), 5.35 (1H, dd, C(7)H$_2$ vinyl), 4.74 (2H, t, C(8)H$_2$—N), 2.97 (2H, tt, C(9)H$_2$—CF$_2$).

EXAMPLE 4

Synthesis of 3-(1H,1H,2H,2H-perfluorooctyl)-1-vinyl-1,3-dihydro-2H-imidazole-2-thione

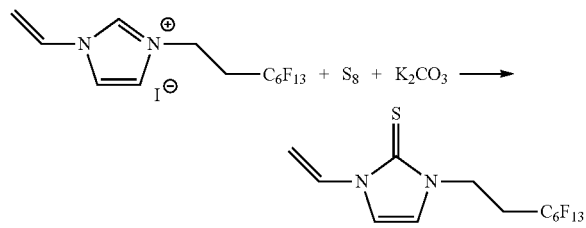

4 g (24.6 mmol) 3-(1H,1H,2H,2H-perfluorooctyl)-1-vinyl-1H-imidazoliumiodide, 0.79 g (24.6 mmol) sulfur and 3.40 g (24.6 mmol) potassium carbonate were presented in a 250 ml round bottom flask and was mixed with 50 ml methanol. The reaction mixture was refluxed for 3 hours. Extraction subsequently took place three times with a respective 150 ml diethyl ether. The combined ether phases were liberated from the solvent at the rotary evaporator; 11.5 g of product was obtained (99% of the theoretical yield). The melting point of the product was 93° C.

$^{13}$C NMR (75 MHz, CDCl$_3$) δ 163.42 (s, C(2)), 130.26 (s, C(6)), 118.55 (s, C(4)), 112.82 (s, C(5)), 126-100 (m, perfluorohexyl), 101.36 (s, C(7)), 40.46 (t, C(8)), 29.63 (t, C(9)).

$^1$H NMR (300 MHz, CDCl$_3$) δ 7.53 (1H, dd, C(6)H vinyl), 6.99 (1H, d, C(5)H imidazole), 6.75 (1H, d, C(4)H imidazole), 5.16 (1H, dd, C(7)H$_2$ vinyl), 4.96 (1H, dd, C(7)H$_2$ vinyl), 4.36 (2H, t, C(8)H$_2$—N), 2.70 (2H, tt, C(9)H$_2$—CF$_2$).

EXAMPLE 5

Synthesis of 3-((3-(1H,1H,2H,2H-perfluorooctyl)-1-vinyl-1H-imidazolium-2-yl)thio)propane-1-sulfonate

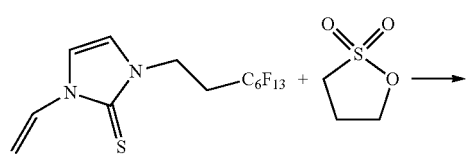

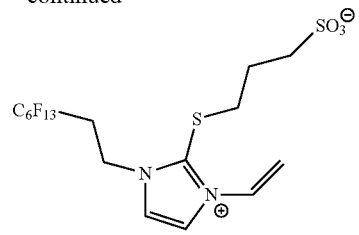

15 g (31.76 mmol) 3-(1H,1H,2H,2H-perfluorooctyl)-1-vinyl-1,3-dihydro-2H-imidazole-2-thione and 4.27 g (35 mmol) propanesultone were dissolved in 50 ml acetonitrile and were refluxed for approximately 20 hours. The solution already turned milky during cooling; the subsequent addition of 300 ml diethyl ether precipitated the product as an extremely sticky yellow solid; the preparation was stored for 6 hours at −32° C. to complete the precipitation. The diethyl ether was decanted after the cooling phase; the residue was dissolved in as little ethanol as possible; the product was subsequently again precipitated from the ethanolic solution using 300 ml diethyl ether. Oil separation again tool place and it slowly became solid in the freezer. Once the product had become solid, the liquid phase was decanted again and the product was subsequently dried in high vacuum overnight. 12.50 g of almost white product (66% of the theoretical yield) resulted.

$^{13}$C NMR (75 MHz, CD$_3$OD) δ 141.82 (s, C(2)), 129.65 (s, C(6)), 126.29 (s, C(5)), 122.65 (s, C(4)), 112.67 (s, C(7)), 126-100 (m, perfluorohexyl), 50.23 (s, C(19)), 43.13 (t, C(8)), 36.50 (s, C(17)), 31.65 (t, C(9)), 26.98 (s, C(18)).

$^1$H NMR (300 MHz, CD$_3$OD) δ 8.36 (1H, d, C(5)H imidazole), 8.17 (1H, d, C(4)H imidazole), 7.62 (1H, dd, C(6)H vinyl), 6.11 (1H, dd, C(7)H$_2$ vinyl), 5.69 (1H, dd, C(7)H$_2$ Vinyl), 4.88 (2H, t, C(8)H$_2$—N), 3.36 (2H, t, C(17)H$_2$—S), 3.06 (2H, tt, C(9)H$_2$—CF$_2$), 2.96 (2H, t, C(19)H$_2$—SO$_3^-$), 2.14 (2H, quin, C(18)H$_2$).

EXAMPLE 6

Synthesis of 3,3'-(hexane-1,6-diyl)bis(2-((1H,1H,2H,2H-perfluorooctyl)thio)-1-vinyl-1H-imidazolium) diiodide

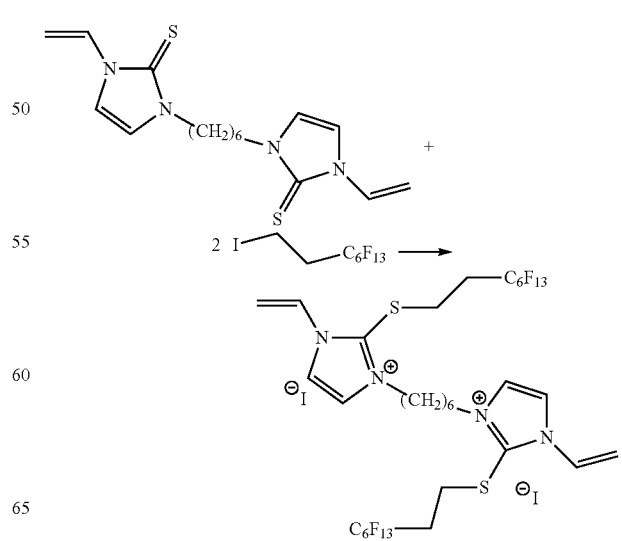

1.25 g (3.74 mmol) 3,3'-(hexane-1,6-diyl)bis(3-vinylimidazole-2-thione) and 7.11 g (15.0 mmol) 1H,1H,2H,2H-perfluorooctyliodide were dissolved in 30 ml acetonitrile and were refluxed for 72 h. 300 ml diethyl ether were subsequently added to initiate precipitation; the reaction mixture was then placed in the freezer at −32° C. for 6 hours. The solid was filtered, washed four times with 30 ml diethyl ether, and was then dried in high vacuum overnight. 3.50 g of yellowish powder (73% of the theoretical yield) were isolated. According to $^1$H-NMR, there is still approximately 5-10% dithione reactant in the product; further purification was, however, dispensed with.

$^{13}$C NMR (75 MHz, DMSO-d6) δ 138.14 (s, C(2)), 128.57 (s, C(6)), 125.07 (s, C(5)), 120.88 (s, C(4)), 110.52 (s, C(7)), 126-100 (m, perfluorohexyl), 49.02 (s, C(8)), 30.39 (t, C(13)), 28.92 (t, C(12)), 27.18 (s, C(9)), 25.04 (s, C(10)).

$^1$H NMR (300 MHz, DMSO-d6), δ 8.53 (2H, d, C(5)H imidazole), 8.25 (2H, d, C(4)H imidazole), 7.51 (2H, dd, C(6)H vinyl), 6.07 (2H, dd, C(7)H$_2$ vinyl), 5.54 (2H, dd, C(7)H$_2$ vinyl), 4.30 (4H, t, C(8)H$_2$—N), 3.27 (4H, t, C(12)H$_2$—S), 2.72 (4H, tt, C(13)H$_2$—CF$_2$), 1.82 (4H, quin, C(9)H$_2$ alkyl), 1.39 (4H, t, C(10)H$_2$ alkyl).

It is noteworthy in the reaction that the vinyl group can be completely removed in other solvents. This was noted with different alkylations at the thione. This secondary reaction can be used directly for an alternative functionalization.

EXAMPLE 7

Synthesis of 3-(1H,1H,2H,2H-perfluorooctyl)-2-((1H,1H,2H,2H-perfluorooctyl)thio)-1-vinyl-1H-imidazoliumiodide

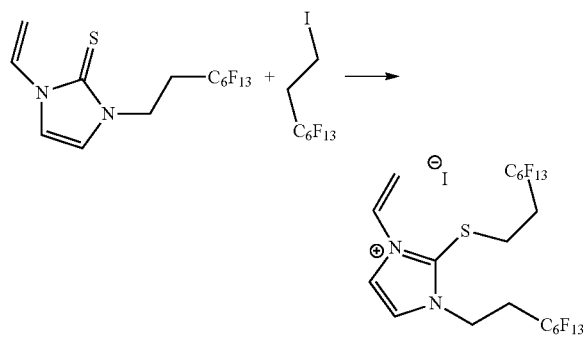

1 g (2.12 mmol) 3-(1H,1H,2H,2H-perfluorooctyl)-1-vinyl-1,3-dihydro-2H-imidazole-2-thione and 1 g (2.12 mmol) 1H,1H,2H,2H-perfluorooctyliodide were dissolved in 5 ml acetonitrile and were refluxed for approximately 20 h. The cooled reaction mixture was subsequently mixed with 50 ml diethyl ether to completely precipitate the product. It was filtered and washed 3 times with 30 ml diethyl ether in each case; it was then dried in high vacuum. 1.02 g (50% of the theoretical yield) of white powder thus resulted.

The recording of the $^1$H-NMR spectrum took place as a perfluorooctyliodide adduct since the pure product is very difficult to dissolve in conventional solvents.

$^1$H NMR (300 MHz, acetone-d6), δ 8.49 (1H, d, C(5)H imidazole), 8.37 (1H, d, C(4) imidazole), 7.75 (1H, dd, C(6)H vinyl), 6.20 (1H, dd, C(7)H$_2$ vinyl), 5.71 (1H, dd, C(7)H$_2$ vinyl), 5.07 (2H, t, C(8)H$_2$—N), 3.61 (2H, t, C(17)H$_2$—S), 3.20 (2H, tt, C(9)H$_2$—CF$_2$), 2.89 (2H, tt, C(18)H$_2$—CF$_2$).

EXAMPLE 8

Synthesis of 3-(1H,1H,2H,2H-perfluorooctyl)-1-vinyl-1H-imidazolium 3-(2-thioxo-3-(1H,1H,2H,2H-perfluorooctyl)-2,3-dihydro-1H-imidazole-1-yl)propane-1-sulfonate

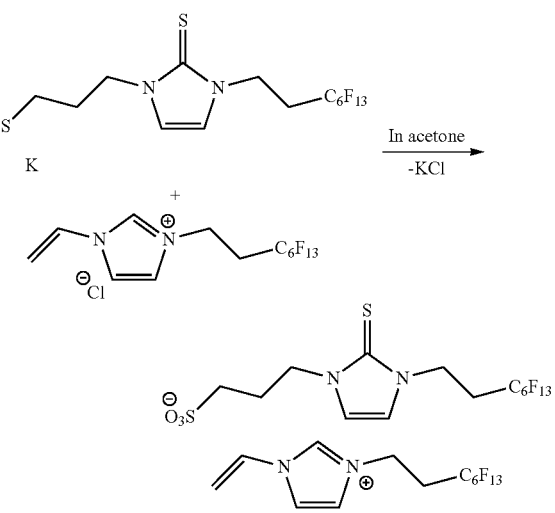

0.157 g (0.33 mmol) 3-(1H,1H,2H,2H-perfluorooctyl)-1-vinyl-1H-imidazoliumchloride and 0.200 g (0.33 mmol) potassium 3-(2-thioxo-3-(1H,1H,2H,2H-perfluorooctyl)-2,3-dihydro-1H-imidazole-1-yl)propane-1-sulfonate were stirred into 10 ml acetone at room temperature overnight, the produced KCl was subsequently filtered, and the acetone was removed using a rotary evaporator. The conversion is quantitative; 263 mg (79% of the theoretical yield) was isolated.

$^1$H NMR (300 MHz, acetone-d6), δ 9.86 (1H, t, C(2)H imidazole), 8.28 (1H, t, C(5)H imidazole), 8.12 (1H, t, C(4)H imidazole), 7.43 (1H, dd, C(6)H vinyl), 7.22 (1H, t, C(20)H imidazole), 7.21 (1H, t, C(19)H imidazole), 6.05 (1H, dt, C(7)H$_2$ vinyl), 5.55 (1H, dt, C(7)H$_2$ vinyl), 4.75 (2H, t, C(8)H$_2$—N), 4.35 (2H, t, C(21)H$_2$—N), 4.13 (2H, t, C(28)H$_2$—N), 3.25 (2H, s (br), C(30)H$_2$—SO$_3$), 3.13 (2H, tt, C(9)H$_2$—CF$_2$), 2.81 (2H, tt, C(22)H$_2$—CF$_2$), 2.48 (2H, quin, C(29)H$_2$).

EXAMPLE 9

Synthesis of 3-(1H,1H,2H,2H-perfluorooctyl)-1-vinyl-1H-imidazolium Acid Blue 215

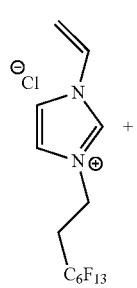

-continued

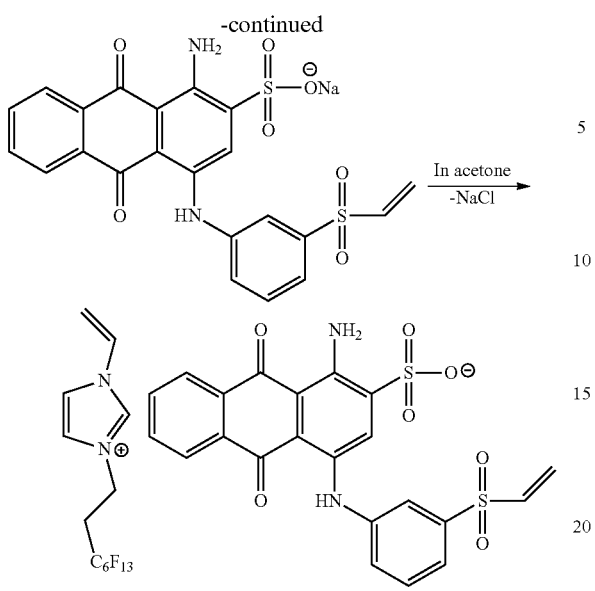

0.600 g (1.18 mmol) Acid Blue 215, sodium salt and 0.562 g (1.18 mmol) 1-(1H,1H,2H,2H-perfluorooctyl)-3-vinyl-1H-imidazoliumchloride were stirred into 20 ml acetone at room temperature overnight, the produced NaCl was subsequently filtered, and the acetone was removed using a rotary evaporator. The conversion is quantitative; 973 mg (1.05 mmol, 89% of the theoretical yield) were isolated.

$^1$H NMR (300 MHz, acetone-d6), δ 12.00 (1H, s, NH sec. amine), 9.75 (1H, s, C(2)H imidazole), 8.28, 7.78 & 7.63 (9H, m, CH aromatic), 8.15 (1H, s, C(5)H imidazole), 8.06 (1H, s, C(4)H imidazole), 7.41 (1H, dd, C(6)H vinyl), 7.03 (1H, dd, CH vinylsulfone), 6.43 (1H, dd, CH$_2$ vinylsulfone), 6.19 (1H, dd, CH$_2$ vinylsulfone), 6.00 (1H, dd, C(7)H$_2$ vinyl), 5.43 (1H, dd, C(7)H$_2$ vinyl), 4.89 (2H, t, C(8)H$_2$—N), 3.25 (2H, s(br), NH$_2$), 3.17 (2H, tt, C(9)H$_2$—CF$_2$).

EXAMPLE 10

Preparation of Hydrophobic and Oleophobic Cotton

A cotton fabric having a size of 18×45 cm and a weight of 10.53 g was washed with 1.3 liters water and 2.45 kg wetting agent (Kiralon Jet B of BASF). The room temperature was 77.5° C. Half an hour after the end of washing, the temperature was still 55.7° C.

The textile was subsequently rinsed 3 times with warm mains water.

It was then dried at 95° C. for three minutes. A piece having the dimensions 11×10 cm and a weight of 1.41 g was subsequently cut out. It then had the recipe shown in Table 2 that had previously been treated in the ultrasound bath for 10 minutes dripped on it by a pipette until the total fabric was completely saturated with the liquid.

TABLE 2

| | |
|---|---|
| 3-(1H,1H,2H,2H perfluorooctyl)-1-vinyl-1H-imidazoliumiodide | 3.01 |
| Azobis(isobutyronitrile) | 1.00 |
| Ethanol, denat. 96% | 95.95 |
| 3,3'-(hexane-1,6-diyl)bis(2-((1H,1H,2H,2H-perfluorooctyl)thio)-1-vinyl-1H-imidazolium) diiodide | 0.04 |
| | 100.00 |

The tissue was now liberated from the excess liquid between two rollers at a pressure of 2 bar and was left in the open at room temperature for 5 minutes. The textile was subsequently placed in the drying oven at 95° C. for 5 minutes. It was then washed 5 times with water at 55° C. The cotton fabric was subsequently placed in the drying oven at 150° C. for 5 minutes.

The textile treated in this manner was now water-repellent and oil-repellant and drops applied to this material were not absorbed even after 1 minute. The contact angle of water was 124° on average. The contact angle for diiodomethane was 123° on average. FIG. 11 shows an image of water droplets on the fabric.

Different fabrics were also able to be made hydrophobic with slightly modified parameters.

EXAMPLE 11

Manufacturing a Coating for Winter Sports Equipment 3 g 3-(1H,1H,2H,2H perfluorooctyl)-1-vinyl-1H-imidazoliumiodide were partially pre-dissolved with 1.0 g diethylacrylamide and subsequently mixed with 1.5 g laurylacrylate. 40 ml isopropanol and 0.1 g 2-hydroxy-2-methyl-1-phenyl-1-propanone were subsequently added. This mixture was then stirred for 10 minutes in a 100 ml glass beaker while stirring using a UV lamp at approximately 365 nm and at a power of 4 W/cm$^2$ and at a distance of 10 cm. The solution thereupon changed color to a reddish brown hue.

The alcohol was subsequently removed and the gel-like polymer was thus obtained. 1.3 g of the polymer mixture obtained in this manner were mixed with 0.03 g SiO$_2$ nanoparticles 10-20 nm of Sigma Aldrich.

The coating for winter sports equipment obtained in this manner was then ironed onto a cross-country ski at 130-150° C.

The obtained product was tested against a commercial product (Fluoropow Middle of HWK) on hard, coarse-grain artificial snow, at an air temperature of 4° C., at a snow temperature of −0.3° C., and at a snow moisture of 25-30%. The test was performed on a slight downhill slope. To exclude external influences, the average time was determined over 6 runs. The time was taken by means of 2 light barriers.

The Fluoropow Middle product had a time of 11.49 seconds.

The newly manufactured product had an average time of 11.45 seconds and was thus 0.04 seconds faster over this short distance.

In addition, this product had no harmful C$_8$F$_{17}$ chains or longer fluoroalkanes. It has a much higher environmental compatibility in comparison with the conventional products.

EXAMPLES 12 TO 19 AND COMPARISON EXAMPLES A TO C

All the examples and comparison examples shown in Table 3 were mixed in the indicated percentage ratios and were subsequently placed briefly into the ultrasound bath. The films were subsequently applied to a glass plate. Spacers of a thickness of 75 μm were inserted on both sides and a PET film was then added with the siliconized side facing downward. A slight pressure was subsequently applied to the PET film so that a homogeneously distributed film is produced. The samples thus prepared were then irradiated with UV light at 365 nm for approximately 10-30 seconds.

Example 12 uses a functionalized monomer in accordance with FIG. 1 having a transverse crosslinker. The composition furthermore contains SiO₂ nanoparticles and solvents. Better contact angles are achieved than for Comparison Examples B and C and values equivalent to Comparison Example A were achieved (problematic from a technical environmental aspect).

Example 13 uses a functionalized monomer having a halogen complex and a transverse crosslinker, SiO₂ nanoparticles, and solvent. Better contact angles are achieved than for Comparison Examples B and C and even better values were achieved than Comparison Example A (problematic from a technical environmental aspect).

Comparison Example A comprises an acrylate monomer known from the prior art that has good contact angles, but is pollutive.

Comparison Example B comprises an acrylate monomer known from the prior art and having a short perfluoroalkyl chain that is environmentally compatible, but achieves worse values than the compositions in accordance with the invention.

Comparison Example C comprises a vinylimidazolium known from the prior art without fluoro side chains that is environmentally compatible, but that likewise achieves worse results than the compositions in accordance with the invention.

TABLE 3

|  | 12 | 13 | 14 | 15 | 16 | 17 | 18 | 19 | A | B | C |
|---|---|---|---|---|---|---|---|---|---|---|---|
| 3-(1H,1H,2H,2H-perfluorooctyl)-1-vinyl-1H-imidazoliumiodide | 15.7 | | | | | | | | | | |
| 2-hydroxy-2-methyl-1-phenylpropane-1-one | 5.4 | 1.7 | 2.6 | 5.6 | 2.7 | 3.6 | 3.6 | 3.1 | 2.6 | 2.4 | 3.4 |
| 3-(1H,1H,2H,2H-perfluorooctyl)-1-vinyl-1H-imidazoliumiodide-1-iodoperfluorooctane | | 15.3 | | | | | | | | | |
| 3M ™ Novec ™ 71 IPA | 43.3 | 33.9 | 44.9 | | 27.1 | 27.2 | 27.2 | 28.8 | 19.5 | | |
| Isopropanol | 27.6 | 33.9 | | | 27.1 | 45.3 | 45.3 | 28.8 | 32.5 | | 8.6 |
| 3M ™ Novec ™ 7500 | 27.3 | | | | | | | | | | |
| Hexanediol diacrylate 50% SiO₂ 50% (Nanocryl C140) | 11.1 | 15.3 | 12.8 | | | 9.1 | 9.1 | 19.2 | 13.0 | 50.0 | 35.0 |
| 3-(1H,1H,2H,2H-perfluorooctyl)-1-vinyl-1H-imidazolium bis(trifluormethanesulfonyl)amide | | | 39.7 | 47.4 | | | | | | | |
| 3,3'-hexamethylenbis(1-vinylimidazolium)-di(bis(trifluormethanesulfonyl)amide) | | | | 47.0 | | | | | | | |
| SiO₂ nanoparticles saturated with 1-methyl-2-((1H,1H,2H,2H-perfluorooctyl)thio)-1H-imidazole | | | | | 0.7 | | | | | | |
| 3-(1H,1H,2H,2H-perfluorooctyl)-1-vinyl-2-((4-vinylbenzyl)thio)-1H-imidazoliumchloride | | | | | 13.5 | | | | | | |
| 1-methyl-2-((1,H,1H,2H,2H-perfluorooctyl)thio)-1H-imidazolium 1,1,1,5,5,5-hexafluoro-2,4-dioxopentane-3-ide | | | | | 28.9 | | | | | | |
| 3-(1,H,1H,2H,2H-perfluoropentyl)-1-vinyl-1H-imidazoliumiodide | | | | | | | | 19.2 | | | |
| 3-(1,H,1H,2H,2H-perfluoro decyl)-1-vinyl-1H-imidazoliumiodide | | | | | | 14.8 | 14.8 | | | | |
| 1H,1H,2H,2H-perfluoroalkyl-1-methacrylates (CAS: 65530-66-7) | | | | | | | | | 32.5 | | |
| Pentafluoropropylacrylate | | | | | | | | | | 47.6 | |
| 3-octyl-1-vinyl-1H-imidazoliumiodide | | | | | | | | | | | 53.0 |
| Water contact angle [°] | 134 | 146 | 130 | 105 | 145 | 151 | 139 | 137 | 141 | 109 | 94 |
| Diiodomethane contact angle [°] | 126 | 136 | 114 | 90 | 147 | 144 | 126 | 130 | 124 | 76 | 55 |

3-(1H,1H,2H,2H-perfluorooctyl)-1-vinyl-1H-imidazoliumbis(trifluormethanesulfonyl)amide is present as the functionalized monomer in Example 14. Better contact angles were achieved than for Comparison Examples B and C.

Example 15 shows a composition without particles that contribute to the surface roughness. Due to the lack of a lotus effect, the values for the contact angles are lower than in the remaining examples in accordance with the invention.

Example 16 comprises a crosslinker monomer in accordance with FIG. 3A and, as an additive, an ionic liquid having fluoro chains that is not polymerizable. The results are so-to-speak superior to the Comparison Examples.

Examples 17 and 18 comprise functionalized monomers having longer perfluoroalkyl chains, with good results being achieved, but with the long perfluoroalkyl chains being of concern from a technical environmental aspect. The coating in Example 17 is here on the non-siliconized side of a PET film and not, as in the other examples, on a glass carrier. FIG. 10 shows an image of the coating manufactured in accordance with Example 17. A drop of olive oil is at the top left and a water droplet at the bottom right.

Example 19 comprises a functionalized monomer having a short fluoro chain, with competitive results likewise being achieved.

EXAMPLE 20

Measurement of the Surface Tension of 3-(1H,1H,2H,2H-perfluorooctyl)-1-vinyl-1H-imidazoliumchloride The surface tension was determined at a suspended drop using a "Drop Shape Analyser DSA 25" of the Krüss corporation. The measurements were performed at temperatures between 23.5 and 25.0° C. and at a relative humidity of approximately 15-30%. The sample was measured a total of ten times. The standard deviation is marked by s in Table 4 shown below.

TABLE 4

| c (w/w %) | OFS (mN/m) | s |
|---|---|---|
| 1 | 20.58 | 0.15 |
| 0.5 | 21.94 | 0.63 |

The monomer in accordance with the invention produced a considerable reduction of the surface tension of water in the indicated concentration ranges.

EXAMPLE 21

Copolymer for Textile Coatings

The components listed in Table 5 below were mixed, were heated to 80° C., and were treated with ultrasound for 10 minutes. An emulsion was produced here.

TABLE 5

| Substance | Quantity |
| --- | --- |
| Butylacrylate | 4.24 g |
| 3-(1H,1H,2H,2H-perfluorooctyl)-1-vinyl-1H-imidazoliumchloride (purity >95%) | 5 g |
| 3-(1H,1H,2H,2H-perfluorooctyl)-2-((1H,1H,2H,2H-perfluorooctypthio)-1-vinyl-1H-imidazoliumchloride (purity >95%) | 3.26 g |
| Water | 72 g |

The emulsion produced was rinsed with argon. A solution of 0.20 g 2,2'-azobis(2-methylpropionamidine)-dihydrochloride in 2 g water was subsequently added at 80° C. The reaction mixture was held at 80° C. overnight.

Approximately 2 g of a macroscopic copolymer that was then removed using a paper filter was formed at the bottom of the test tube.

The (latex) emulsion thus obtained was diluted with 20 g water, was applied to a textile of cotton, and was dried at 50° C. for 5 minutes. The fabric was subsequently heated at 150° C. for 1 minute.

The textile thus treated was examined as to its hydrophobic and oleophobic properties. Pronounced water-repellant and oil-repellant properties were displayed. A value of 5.5 was obtained in the AATCC Test 118 with n-dodecane. The test is described in detail in paragraph [0038] of EP 2 057 201 B1.

In addition to the textile fabric, a paper was wetted with the emulsion and was dried in air overnight. A film was formed that was repellant with respect to dodecane.

EXAMPLE 22

Copolymer for Textile Coating

The components listed in Table 6 below were mixed, were heated to 40° C., and were treated with ultrasound for 15 minutes to produce a stable emulsion. A temperature increase to almost 60° C. was observed during the ultrasound treatment.

TABLE 6

| Substance | Quantity |
| --- | --- |
| Octadecylacrylate | 1.5 g |
| Butylacrylate | 0.5 g |
| 3-(1H,1H,2H,2H perfluorooctyl)-1-vinyl-1H-imidazoliumchloride (purity >95%) | 0.2 g |
| 3-(1H,1H,2H,2H-perfluorooctyl)-2-(1H,1H,2H,2H-perfluorooctyl)thio)-1-vinyl-1H-imidazoliumchloride (purity >95%) | 2 g |
| Hydroxyethylmethacrylate | 0.1 g |
| N-(Isobutoxymethyl)acrylamide | 0.11 g |
| Glycidylmethacrylate | 0.15 g |

TABLE 6-continued

| Substance | Quantity |
| --- | --- |
| GenopolX080 (=polyethylenglycolmonoalkylether of the Clariant corporation) | 0.1 g |
| Diethyleneglycolmonobutylether | 7.25 g |
| Water | 40 g |
| Dodecanethiol | 0.2 g |

The emulsion was subsequently heated to 80° C. and held under a protective gas atmosphere. After an hour, a solution of 0.2 g 2,2'-azobis(2-methylpropioneamidina)-dihydrochloride in 3 ml water was added and the resulting mixture was held at 80° C. for 6 hours up to the complete reaction. The solution obtained was diluted with 30 g water to obtain a product solution.

A cotton fabric was wetted with this product solution, was dried at 50° C., and was fixed at 150° C. for 2 minutes. It demonstrated water-repellant and oil-repellant properties.

EXAMPLE 23

Copolymer for Lacquer Applications

The components listed in the following Table 7 were mixed at room temperature.

TABLE 7

| Substance | Quantity |
| --- | --- |
| 2,2-dimethoxy-2-phenylacetophenone | 10 mg |
| 3-(1H,1H,2H,2H perfluorooctyl)-1-vinyl-1H-imidazoliumiodide (purity >99%) | 85 mg |
| Ethylenedimethacrylate | 100 µL |
| 1-Propanol | 125 µL |
| Acetonitrile | 125 µL |
| Water | 75 µL |

Two glass plates were pretreated with triethoxyvinylsilane in 96% ethanol. The glass plates were then placed face on face and were set using a spacer to a spacing of 75 µm. The mixture in accordance with Table 7 was introduced between the plates using a pipette. Curing was subsequently performed with a UV lamp at 365 nm. The two plates were subsequently carefully separated from one another. A macroscopic coating that was water-repellant and oil-repellant formed on both glass plates.

The measured contact angles of the coated surfaces were above 160° both for water and for diiodomethane and hexadecane.

Microscopic photographs of the coated surfaces are shown in FIGS. 12A and 12B. A very rough surface was to be expected due to the high contact angles of the coating in accordance with the invention, which was able to be confirmed by these photographs. The surface roughness is an important feature of superomniphobic coatings. The lotus leaf is often used as a model from nature; it has a rough surface that has omniphobic and therefore self-cleaning properties.

An influence of the solvents used on the contact angles was able to be determined. The mixture used of 1-propanol, acetonitrile, and water here resulted in high contact angles and in a high surface roughness. Other mixtures demonstrated similarly good contact angles and surface roughnesses.

EXAMPLE 24

Copolymer for Textile Coating

The components indicated in the following Table 8 were intensely stirred in an autoclave under an inert gas atmosphere at 60° C. to produce an emulsion.

TABLE 8

| Substance | Quantity |
| --- | --- |
| Stearyl acrylate | 22.5 g |
| Vinylidene chloride | 15.5 g |
| N-methoxymethylacrylamide | 1 g |
| Hydroxyethylmethacrylate | 1 g |
| Dipropyleneglycol | 30 g |
| Dodecanethiol | 0.5 g |
| Genapol x 100 (oligoethyleneglycolmonoalkylether/ Sigma Aldrich) | 4 g |
| Hexadecyltrimethyl ammonium chloride (25% solution in water) | 3.5 g |
| Water | 200 g |
| 1H,1H,2H,2H-perfluorooctylmethacrylate | 40 g |
| 3-(1H,1H,2H,2H-perfluorooctyl)-2-((1H,1H,2H,2H-perfluorooctyl)thio)-1-vinyl-1H-imidazoliumchloride (purity >95%) | 15 g |
| 3-(1H,1H,2H,2H-perfluorooctyl)-1-vinyl-1H-imidazoliumiodide (purity >95%) | 5 g |

0.6 g 2,2'-azobis(2-methylpropioneamidine)-dihydrochloride were added to the emulsion thus obtained. The resulting reaction solution was held at 60° C. for 6 h to perform the polymerization reaction. Non-reacted vinylidene chloride was subsequently distilled. The solid portion of the residue was approximately 30%. 5 g/l of a polyisocyanate (Cassurit FF, Archroma) was added to the residue for better adhesion to the textile fabric.

A textile of cotton was wetted with the product solution thus obtained, was dried at 50° C., and was fixed at 150° C. for 1 minute. The textile obtained was water-repellent and oil-repellant. These properties were also still observed after five washing procedures.

EXAMPLE 25

Copolymer for Lacquer Applications 0.15 g 3-(1H,1H,2H,2H-perfluorooctyl)-2-((1H,1H,2H,2H-perfluorooctyl)thio)-1-vinyl-1H-imidazoliumchloride and 0.05 g 3-(trimethoxysilyl)propylmethacrylate were stirred in 5 ml ethanol with 0.005 g azobisisobutyronitrile at 65° C. under an argon atmosphere for 6 h. A glass body was subsequently pretreated with 3-(trimethoxysilyl)propylmethacrylate and then wetted with the prepolymer solution obtained as described above and with 0.005 g 2-hydroxy-2-methylpropiophenone. The prepolymer was then covalently bonded to the glass using a UV lamp at a wavelength of 365 nm.

The glass coated in this manner also demonstrated even more hydrophobic and oleophobic properties than untreated glass after an intense washing.

EXAMPLE 26

Hydrogel

The components listed in Table 9 below were stirred to form a homogeneous solution.

TABLE 9

| Substance | Quantity |
| --- | --- |
| Hydroxyethylmethacrylate | 30 ml |
| Ethyleneglycoldimethacrylate | 0.52 g |
| Water | 18 ml |
| 3-(1H,1H,2H,2H perfluorooctyl)-1-vinyl-1H-imidazoliumchloride | 5 g |
| 2,2-dimethoxy-2-phenylacetophenone | 0.52 g |

The solution thus obtained was applied to a substrate and was cured using UV light at 365 nm. A transparent hydrogel was produced. These and comparable compositions could be used in contact lenses.

The invention claimed is:
1. A method of manufacturing a coated article, said method comprising wetting a surface of an article with a crosslinkable composition and wherein the crosslinkable composition is subsequently crosslinked to form a coating on the article, and said crosslinkable composition comprising functionalized monomers that have a crosslinkable group, a cationic group, and a fluorinated group, and anions corresponding to the cationic group of the functionalized monomers, and wherein the cross-linkable group comprises a cross-linkable ethylenic functionality and the cationic group is an N-substituted cyclic group that comprises a 5-membered ring and/or at least two heteroatoms; and in that a spacer is arranged between the cationic group and the fluorinated group, said spacer being an uncharged and unfluorinated organyl group.

2. The method of claim 1, wherein the cationic group is an N,N-disubstituted imidazolium group.

3. The method of claim 1, wherein the spacer is a linear alkylene group having 1 to 10 carbon atoms.

4. The method of claim 1, wherein the fluorinated group is a completely fluorinated hydrocarbon group.

5. The method of claim 1, wherein the functionalized monomer further comprises a thioether.

6. The method of claim 5, wherein the sulfur-bonded organyl residue of the thioether carries the crosslinkable group or a further crosslinkable group, with the further crosslinkable group being able to be a crosslinkable ethylenic functionality or a non-ethylenic crosslinkable group.

7. The method of claim 5, wherein the functionalized monomer has a further group that is substituted at the organyl residue of the organyl sulfide group or that represents the sulfur-bonded organyl residue of the thioether.

8. The method of claim 5, wherein the sulfur-bonded organyl residue of the thioether carries the anion corresponding to the cationic group, with the anion being a sulfate group, a sulfonate group, a phosphonate group, a phosphate group, a carbonate group, a carbamate group, a triflate group, or a carboxylate group substituted at the organyl residue.

9. The method of claim 1, wherein at least some of the anions are not covalently bonded to the copolymer, with provision being made that the free anion is chloride, iodide, bromide, aryl sulfonate, alkyl sulfonate, alkyl sulfate, sulfate, aryl phosphonate, alkyl phosphonate, monoalkyl phosphate, dialkyl phosphate, hydrogen phosphate, phosphate, hexafluorophosphate, hydrogen carbonate, carbonate, carbamate, alkyl carbonate, trifluoromethanesulfonate, bis(trifluoromethane)sulfonamide, nonaflate, or carboxylate.

10. The method of claim 1, wherein at least some of the anions are covalently bonded to the functionalized monomer, with it being an organyl-bonded sulfate group, sulfonate group, phosphonate group, phosphate group, carbonate group, carbamate group, triflate group, or carboxylate group.

11. The method of claim 1, wherein at least some of the anions are a halogenide.

12. The method of claim 11, wherein the composition further comprises a halogenoalkane.

13. The method of claim 1, wherein the composition comprises additional monomers that have at least one crosslinkable group, but do not further have either a cationic group or a fluorinated group.

14. The method of claim 1, wherein the composition further comprises an initiator; and/or the composition further has an ionic additive.

15. The method of claim 1, wherein said spacer is an alkylene group.

16. The method of claim 1, wherein said crosslinkable group comprises a substituted or unsubstituted vinyl group.

17. The method of claim 1, wherein the fluorinated group has the formula $C_nF_{2n+1}$, where n is 3 to 10.

* * * * *